US008886518B1

(12) United States Patent
Wang et al.

(10) Patent No.: US 8,886,518 B1
(45) Date of Patent: Nov. 11, 2014

(54) SYSTEM AND METHOD FOR CAPITALIZING MACHINE TRANSLATED TEXT

(75) Inventors: Wei Wang, Culver City, CA (US); Kevin Knight, Marina Del Ray, CA (US); Daniel Marcu, Hermosa Beach, CA (US)

(73) Assignee: Language Weaver, Inc., Los Angeles, CA (US)

( * ) Notice: Subject to any disclaimer, the term of this patent is extended or adjusted under 35 U.S.C. 154(b) by 1170 days.

(21) Appl. No.: 11/501,189

(22) Filed: Aug. 7, 2006

(51) Int. Cl.
*G06F 17/20* (2006.01)
*G06F 17/28* (2006.01)
*G06F 17/27* (2006.01)

(52) U.S. Cl.
USPC ............ 704/9; 704/1; 704/2; 704/4; 704/5; 704/6; 715/256; 715/264; 715/265

(58) Field of Classification Search
CPC ....... G06F 17/20; G06F 17/21; G06F 17/211; G06F 17/214; G06F 17/27; G06F 17/273; G06F 17/274; G06F 17/2745; G06F 17/275; G06F 17/2765; G06F 17/277; G06F 17/2775; G06F 17/278; G06F 17/28; G06F 17/2881; G06F 17/289; G06F 3/018
USPC ........... 704/1, 2, 4, 5, 6, 9; 715/256, 264, 265
See application file for complete search history.

(56) References Cited

U.S. PATENT DOCUMENTS

| | | |
|---|---|---|
| 4,502,128 A | 2/1985 | Okajima et al. |
| 4,599,691 A | 7/1986 | Sakaki et al. |
| 4,615,002 A | 9/1986 | Innes |
| 4,661,924 A | 4/1987 | Okamoto et al. |
| 4,787,038 A | 11/1988 | Doi et al. |
| 4,791,587 A | 12/1988 | Doi |
| 4,800,522 A | 1/1989 | Miyao et al. |
| 4,814,987 A | 3/1989 | Miyao et al. |
| 4,942,526 A | 7/1990 | Okajima et al. |
| 4,980,829 A | 12/1990 | Okajima et al. |
| 5,020,112 A | 5/1991 | Chou |
| 5,088,038 A | 2/1992 | Tanaka et al. |
| 5,091,876 A | 2/1992 | Kumano et al. |
| 5,146,405 A | 9/1992 | Church |
| 5,167,504 A | 12/1992 | Mann |
| 5,181,163 A | 1/1993 | Nakajima et al. |

(Continued)

FOREIGN PATENT DOCUMENTS

| | | |
|---|---|---|
| DE | 202005022113.9 | 2/2014 |
| EP | 0469884 A2 | 2/1992 |

(Continued)

OTHER PUBLICATIONS

Lita, L. V., Ittycheriah, A., Roukos, S., and Kambhatla, N.(2003). tRuEcasing. In Hinrichs, E. and Roth, D., editors,Proceedings of the 41st Annual Meeting of the Associationfor Computational Linguistics, pp. 152-159.*

(Continued)

*Primary Examiner* — Paras D Shah
(74) *Attorney, Agent, or Firm* — Carr & Ferrell LLP

(57) ABSTRACT

A system and method for capitalizing translated text is provided. A capitalized source text is automatically translated to a target text. The target text is capitalized according to information in the capitalized source text.

24 Claims, 6 Drawing Sheets

(56) References Cited

U.S. PATENT DOCUMENTS

| | | | |
|---|---|---|---|
| 5,212,730 A | 5/1993 | Wheatley et al. | |
| 5,218,537 A | 6/1993 | Hemphill et al. | |
| 5,220,503 A | 6/1993 | Suzuki et al. | |
| 5,267,156 A | 11/1993 | Nomiyama | |
| 5,268,839 A | 12/1993 | Kaji | |
| 5,295,068 A | 3/1994 | Nishino et al. | |
| 5,302,132 A | 4/1994 | Corder | |
| 5,311,429 A | 5/1994 | Tominaga | |
| 5,387,104 A | 2/1995 | Corder | |
| 5,408,410 A | 4/1995 | Kaji | |
| 5,432,948 A | 7/1995 | Davis et al. | |
| 5,442,546 A | 8/1995 | Kaji et al. | |
| 5,477,450 A | 12/1995 | Takeda et al. | |
| 5,477,451 A | 12/1995 | Brown et al. | |
| 5,495,413 A | 2/1996 | Kutsumi et al. | |
| 5,497,319 A | 3/1996 | Chong et al. | |
| 5,510,981 A * | 4/1996 | Berger et al. | 704/2 |
| 5,528,491 A * | 6/1996 | Kuno et al. | 704/9 |
| 5,535,120 A | 7/1996 | Chong et al. | |
| 5,541,836 A | 7/1996 | Church et al. | |
| 5,541,837 A | 7/1996 | Fushimoto | |
| 5,548,508 A | 8/1996 | Nagami | |
| 5,644,774 A | 7/1997 | Fukumochi et al. | |
| 5,675,815 A | 10/1997 | Yamauchi et al. | |
| 5,687,383 A | 11/1997 | Nakayama et al. | |
| 5,696,980 A | 12/1997 | Brew | |
| 5,724,593 A | 3/1998 | Hargrave, III et al. | |
| 5,752,052 A | 5/1998 | Richardson et al. | |
| 5,754,972 A | 5/1998 | Baker et al. | |
| 5,761,631 A | 6/1998 | Nasukawa | |
| 5,761,689 A * | 6/1998 | Rayson et al. | 715/210 |
| 5,768,603 A | 6/1998 | Brown et al. | |
| 5,779,486 A | 7/1998 | Ho et al. | |
| 5,781,884 A | 7/1998 | Pereira et al. | |
| 5,794,178 A | 8/1998 | Caid et al. | |
| 5,805,832 A | 9/1998 | Brown et al. | |
| 5,806,032 A | 9/1998 | Sproat | |
| 5,819,265 A | 10/1998 | Ravin et al. | |
| 5,826,219 A | 10/1998 | Kutsumi | |
| 5,826,220 A | 10/1998 | Takeda et al. | |
| 5,845,143 A | 12/1998 | Yamauchi et al. | |
| 5,848,385 A | 12/1998 | Poznanski et al. | |
| 5,848,386 A | 12/1998 | Motoyama | |
| 5,855,015 A | 12/1998 | Shoham | |
| 5,864,788 A | 1/1999 | Kutsumi | |
| 5,867,811 A | 2/1999 | O'Donoghue | |
| 5,870,706 A | 2/1999 | Alshawi | |
| 5,893,134 A | 4/1999 | O'Donoghue et al. | |
| 5,903,858 A | 5/1999 | Saraki | |
| 5,907,821 A | 5/1999 | Kaji et al. | |
| 5,909,681 A | 6/1999 | Passera et al. | |
| 5,930,746 A | 7/1999 | Ting | |
| 5,966,685 A | 10/1999 | Flanagan et al. | |
| 5,966,686 A | 10/1999 | Heidorn et al. | |
| 5,983,169 A | 11/1999 | Kozma | |
| 5,987,402 A | 11/1999 | Murata et al. | |
| 5,987,404 A | 11/1999 | Della Pietra et al. | |
| 5,991,710 A | 11/1999 | Papineni et al. | |
| 5,995,922 A * | 11/1999 | Penteroudakis et al. | 704/9 |
| 6,018,617 A | 1/2000 | Sweitzer et al. | |
| 6,031,984 A | 2/2000 | Walser | |
| 6,032,111 A | 2/2000 | Mohri | |
| 6,047,252 A | 4/2000 | Kumano et al. | |
| 6,064,819 A | 5/2000 | Franssen et al. | |
| 6,064,951 A | 5/2000 | Park et al. | |
| 6,073,143 A | 6/2000 | Nishikawa et al. | |
| 6,077,085 A | 6/2000 | Parry et al. | |
| 6,092,034 A | 7/2000 | McCarley et al. | |
| 6,119,077 A | 9/2000 | Shinozaki | |
| 6,131,082 A | 10/2000 | Hargrave, III et al. | |
| 6,161,082 A | 12/2000 | Goldberg et al. | |
| 6,182,014 B1 | 1/2001 | Kenyon et al. | |
| 6,182,027 B1 | 1/2001 | Nasukawa et al. | |
| 6,205,456 B1 | 3/2001 | Nakao | |
| 6,206,700 B1 | 3/2001 | Brown et al. | |
| 6,223,150 B1 | 4/2001 | Duan et al. | |
| 6,233,544 B1 | 5/2001 | Alshawi | |
| 6,233,545 B1 | 5/2001 | Datig | |
| 6,233,546 B1 | 5/2001 | Datig | |
| 6,236,958 B1 | 5/2001 | Lange et al. | |
| 6,269,351 B1 | 7/2001 | Black | |
| 6,275,789 B1 | 8/2001 | Moser et al. | |
| 6,278,967 B1 | 8/2001 | Akers et al. | |
| 6,278,969 B1 | 8/2001 | King et al. | |
| 6,285,978 B1 | 9/2001 | Bernth et al. | |
| 6,289,302 B1 | 9/2001 | Kuo | |
| 6,304,841 B1 | 10/2001 | Berger et al. | |
| 6,311,152 B1 | 10/2001 | Bai et al. | |
| 6,317,708 B1 | 11/2001 | Witbrock et al. | |
| 6,327,568 B1 | 12/2001 | Joost | |
| 6,330,529 B1 | 12/2001 | Ito | |
| 6,330,530 B1 | 12/2001 | Horiguchi et al. | |
| 6,356,864 B1 | 3/2002 | Foltz et al. | |
| 6,360,196 B1 | 3/2002 | Poznanski et al. | |
| 6,389,387 B1 | 5/2002 | Poznanski et al. | |
| 6,393,388 B1 | 5/2002 | Franz et al. | |
| 6,393,389 B1 | 5/2002 | Chanod et al. | |
| 6,415,250 B1 | 7/2002 | van den Akker | |
| 6,460,015 B1 | 10/2002 | Hetherington et al. | |
| 6,470,306 B1 * | 10/2002 | Pringle et al. | 704/3 |
| 6,473,729 B1 | 10/2002 | Gastaldo et al. | |
| 6,473,896 B1 | 10/2002 | Hicken et al. | |
| 6,480,698 B2 | 11/2002 | Ho et al. | |
| 6,490,549 B1 * | 12/2002 | Ulicny et al. | 704/10 |
| 6,498,921 B1 | 12/2002 | Ho et al. | |
| 6,502,064 B1 | 12/2002 | Miyahira et al. | |
| 6,529,865 B1 | 3/2003 | Duan et al. | |
| 6,535,842 B1 | 3/2003 | Roche et al. | |
| 6,587,844 B1 | 7/2003 | Mohri | |
| 6,609,087 B1 | 8/2003 | Miller et al. | |
| 6,647,364 B1 | 11/2003 | Yumura et al. | |
| 6,691,279 B2 | 2/2004 | Yoden et al. | |
| 6,745,161 B1 | 6/2004 | Arnold et al. | |
| 6,745,176 B2 | 6/2004 | Probert, Jr. et al. | |
| 6,757,646 B2 | 6/2004 | Marchisio | |
| 6,778,949 B2 | 8/2004 | Duan et al. | |
| 6,782,356 B1 | 8/2004 | Lopke | |
| 6,810,374 B2 | 10/2004 | Kang | |
| 6,848,080 B1 | 1/2005 | Lee et al. | |
| 6,857,022 B1 | 2/2005 | Scanlan | |
| 6,885,985 B2 | 4/2005 | Hull | |
| 6,901,361 B1 | 5/2005 | Portilla | |
| 6,904,402 B1 | 6/2005 | Wang et al. | |
| 6,952,665 B1 | 10/2005 | Shimomura et al. | |
| 6,983,239 B1 | 1/2006 | Epstein | |
| 6,996,518 B2 | 2/2006 | Jones et al. | |
| 6,996,520 B2 | 2/2006 | Levin | |
| 6,999,925 B2 | 2/2006 | Fischer et al. | |
| 7,013,262 B2 | 3/2006 | Tokuda et al. | |
| 7,016,827 B1 | 3/2006 | Ramaswamy et al. | |
| 7,016,977 B1 | 3/2006 | Dunsmoir et al. | |
| 7,024,351 B2 | 4/2006 | Wang | |
| 7,031,911 B2 | 4/2006 | Zhou et al. | |
| 7,050,964 B2 | 5/2006 | Menzes et al. | |
| 7,085,708 B2 | 8/2006 | Manson | |
| 7,089,493 B2 | 8/2006 | Hatori et al. | |
| 7,103,531 B2 | 9/2006 | Moore | |
| 7,107,204 B1 | 9/2006 | Liu et al. | |
| 7,107,215 B2 | 9/2006 | Ghali | |
| 7,113,903 B1 | 9/2006 | Riccardi et al. | |
| 7,143,036 B2 | 11/2006 | Weise | |
| 7,146,358 B1 | 12/2006 | Gravano et al. | |
| 7,149,688 B2 | 12/2006 | Schalkwyk | |
| 7,171,348 B2 | 1/2007 | Scanlan | |
| 7,174,289 B2 | 2/2007 | Sukehiro | |
| 7,177,792 B2 | 2/2007 | Knight et al. | |
| 7,191,115 B2 | 3/2007 | Moore | |
| 7,194,403 B2 | 3/2007 | Okura et al. | |
| 7,197,451 B1 | 3/2007 | Carter et al. | |
| 7,206,736 B2 | 4/2007 | Moore | |
| 7,209,875 B2 | 4/2007 | Quirk et al. | |
| 7,219,051 B2 | 5/2007 | Moore | |
| 7,239,998 B2 | 7/2007 | Xun | |
| 7,249,012 B2 | 7/2007 | Moore | |

(56) References Cited

U.S. PATENT DOCUMENTS

| | | |
|---|---|---|
| 7,249,013 B2 | 7/2007 | Al-Onaizan et al. |
| 7,283,950 B2 | 10/2007 | Pournasseh et al. |
| 7,295,962 B2 | 11/2007 | Marcu |
| 7,302,392 B1 | 11/2007 | Thenthiruperai et al. |
| 7,319,949 B2 | 1/2008 | Pinkham |
| 7,340,388 B2 | 3/2008 | Soricut et al. |
| 7,346,487 B2 | 3/2008 | Li |
| 7,346,493 B2 | 3/2008 | Ringger et al. |
| 7,349,839 B2 | 3/2008 | Moore |
| 7,349,845 B2 | 3/2008 | Coffman et al. |
| 7,356,457 B2 | 4/2008 | Pinkham et al. |
| 7,369,998 B2 | 5/2008 | Sarich et al. |
| 7,373,291 B2 | 5/2008 | Garst |
| 7,383,542 B2 | 6/2008 | Richardson et al. |
| 7,389,222 B1 | 6/2008 | Langmead et al. |
| 7,389,234 B2 | 6/2008 | Schmid et al. |
| 7,403,890 B2 | 7/2008 | Roushar |
| 7,409,332 B2 | 8/2008 | Moore |
| 7,409,333 B2 | 8/2008 | Wilkinson et al. |
| 7,447,623 B2 | 11/2008 | Appleby |
| 7,454,326 B2 | 11/2008 | Marcu et al. |
| 7,496,497 B2 | 2/2009 | Liu |
| 7,533,013 B2 | 5/2009 | Marcu |
| 7,536,295 B2 | 5/2009 | Cancedda et al. |
| 7,546,235 B2 | 6/2009 | Brockett et al. |
| 7,552,053 B2 | 6/2009 | Gao et al. |
| 7,565,281 B2 | 7/2009 | Appleby |
| 7,574,347 B2 | 8/2009 | Wang |
| 7,580,830 B2 | 8/2009 | Al-Onaizan et al. |
| 7,584,092 B2 * | 9/2009 | Brockett et al. ............... 704/9 |
| 7,587,307 B2 | 9/2009 | Cancedda et al. |
| 7,620,538 B2 | 11/2009 | Marcu et al. |
| 7,620,632 B2 | 11/2009 | Andrews |
| 7,624,005 B2 | 11/2009 | Koehn et al. |
| 7,624,020 B2 | 11/2009 | Yamada et al. |
| 7,627,479 B2 | 12/2009 | Travieso et al. |
| 7,680,646 B2 | 3/2010 | Lux-Pogodalla et al. |
| 7,689,405 B2 | 3/2010 | Marcu |
| 7,698,124 B2 | 4/2010 | Menezes et al. |
| 7,698,125 B2 | 4/2010 | Graehl et al. |
| 7,707,025 B2 | 4/2010 | Whitelock |
| 7,711,545 B2 | 5/2010 | Koehn |
| 7,716,037 B2 | 5/2010 | Precoda et al. |
| 7,801,720 B2 | 9/2010 | Satake et al. |
| 7,813,918 B2 | 10/2010 | Muslea et al. |
| 7,822,596 B2 | 10/2010 | Elgazzar et al. |
| 7,925,494 B2 | 4/2011 | Cheng et al. |
| 7,957,953 B2 | 6/2011 | Moore |
| 7,974,833 B2 | 7/2011 | Soricut et al. |
| 8,060,360 B2 | 11/2011 | He |
| 8,145,472 B2 | 3/2012 | Shore et al. |
| 8,214,196 B2 | 7/2012 | Yamada et al. |
| 8,244,519 B2 | 8/2012 | Bicici et al. |
| 8,265,923 B2 | 9/2012 | Chatterjee et al. |
| 8,615,389 B1 | 12/2013 | Marcu |
| 2001/0009009 A1 | 7/2001 | Iizuka |
| 2001/0029455 A1 * | 10/2001 | Chin et al. ............... 704/277 |
| 2002/0002451 A1 | 1/2002 | Sukehiro |
| 2002/0013693 A1 | 1/2002 | Fuji |
| 2002/0040292 A1 | 4/2002 | Marcu |
| 2002/0046018 A1 | 4/2002 | Marcu et al. |
| 2002/0046262 A1 | 4/2002 | Heilig et al. |
| 2002/0059566 A1 | 5/2002 | Delcambre et al. |
| 2002/0078091 A1 | 6/2002 | Vu et al. |
| 2002/0087313 A1 | 7/2002 | Lee et al. |
| 2002/0099744 A1 * | 7/2002 | Coden et al. ............... 707/531 |
| 2002/0111788 A1 | 8/2002 | Kimpara |
| 2002/0111789 A1 | 8/2002 | Hull |
| 2002/0111967 A1 | 8/2002 | Nagase |
| 2002/0143537 A1 | 10/2002 | Ozawa et al. |
| 2002/0152063 A1 | 10/2002 | Tokieda et al. |
| 2002/0169592 A1 | 11/2002 | Aityan |
| 2002/0188438 A1 | 12/2002 | Knight et al. |
| 2002/0188439 A1 | 12/2002 | Marcu |
| 2002/0198699 A1 | 12/2002 | Greene et al. |
| 2002/0198701 A1 | 12/2002 | Moore |
| 2002/0198713 A1 | 12/2002 | Franz et al. |
| 2003/0009322 A1 | 1/2003 | Marcu |
| 2003/0023423 A1 | 1/2003 | Yamada et al. |
| 2003/0144832 A1 | 7/2003 | Harris |
| 2003/0154071 A1 | 8/2003 | Shreve |
| 2003/0158723 A1 | 8/2003 | Masuichi et al. |
| 2003/0176995 A1 | 9/2003 | Sukehiro |
| 2003/0182102 A1 | 9/2003 | Corston-Oliver et al. |
| 2003/0191626 A1 | 10/2003 | Al-Onaizan et al. |
| 2003/0204400 A1 | 10/2003 | Marcu et al. |
| 2003/0216905 A1 | 11/2003 | Chelba et al. |
| 2003/0217052 A1 | 11/2003 | Rubenczyk et al. |
| 2003/0233222 A1 | 12/2003 | Soricut et al. |
| 2004/0006560 A1 | 1/2004 | Chan et al. |
| 2004/0015342 A1 | 1/2004 | Garst |
| 2004/0024581 A1 | 2/2004 | Koehn et al. |
| 2004/0030551 A1 | 2/2004 | Marcu et al. |
| 2004/0035055 A1 | 2/2004 | Zhu et al. |
| 2004/0044530 A1 | 3/2004 | Moore |
| 2004/0059708 A1 | 3/2004 | Dean et al. |
| 2004/0068411 A1 | 4/2004 | Scanlan |
| 2004/0098247 A1 * | 5/2004 | Moore ............... 704/4 |
| 2004/0102956 A1 | 5/2004 | Levin |
| 2004/0102957 A1 | 5/2004 | Levin |
| 2004/0111253 A1 | 6/2004 | Luo et al. |
| 2004/0115597 A1 | 6/2004 | Butt |
| 2004/0122656 A1 | 6/2004 | Abir |
| 2004/0167768 A1 | 8/2004 | Travieso et al. |
| 2004/0167784 A1 | 8/2004 | Travieso et al. |
| 2004/0193401 A1 | 9/2004 | Ringger et al. |
| 2004/0230418 A1 | 11/2004 | Kitamura |
| 2004/0237044 A1 | 11/2004 | Travieso et al. |
| 2004/0260532 A1 | 12/2004 | Richardson et al. |
| 2005/0021322 A1 | 1/2005 | Richardson et al. |
| 2005/0021517 A1 | 1/2005 | Marchisio |
| 2005/0026131 A1 | 2/2005 | Elzinga et al. |
| 2005/0033565 A1 | 2/2005 | Koehn |
| 2005/0038643 A1 | 2/2005 | Koehn |
| 2005/0055199 A1 | 3/2005 | Ryzchachkin et al. |
| 2005/0055217 A1 | 3/2005 | Sumita et al. |
| 2005/0060160 A1 | 3/2005 | Roh et al. |
| 2005/0075858 A1 | 4/2005 | Pournasseh et al. |
| 2005/0086226 A1 | 4/2005 | Krachman |
| 2005/0102130 A1 | 5/2005 | Quirk et al. |
| 2005/0125218 A1 | 6/2005 | Rajput et al. |
| 2005/0149315 A1 | 7/2005 | Flanagan et al. |
| 2005/0171757 A1 | 8/2005 | Appleby |
| 2005/0204002 A1 | 9/2005 | Friend |
| 2005/0228640 A1 | 10/2005 | Aue et al. |
| 2005/0228642 A1 * | 10/2005 | Mau et al. ............... 704/9 |
| 2005/0228643 A1 | 10/2005 | Munteanu et al. |
| 2005/0234701 A1 | 10/2005 | Graehl et al. |
| 2005/0267738 A1 | 12/2005 | Wilkinson et al. |
| 2006/0004563 A1 | 1/2006 | Campbell et al. |
| 2006/0015320 A1 | 1/2006 | Och |
| 2006/0015323 A1 | 1/2006 | Udupa et al. |
| 2006/0018541 A1 * | 1/2006 | Chelba et al. ............... 382/181 |
| 2006/0020448 A1 * | 1/2006 | Chelba et al. ............... 704/10 |
| 2006/0041428 A1 | 2/2006 | Fritsch et al. |
| 2006/0095248 A1 | 5/2006 | Menezes et al. |
| 2006/0111891 A1 | 5/2006 | Menezes et al. |
| 2006/0111892 A1 | 5/2006 | Menezes et al. |
| 2006/0111896 A1 | 5/2006 | Menezes et al. |
| 2006/0129424 A1 | 6/2006 | Chan |
| 2006/0142995 A1 | 6/2006 | Knight et al. |
| 2006/0150069 A1 | 7/2006 | Chang |
| 2006/0167984 A1 | 7/2006 | Fellenstein et al. |
| 2006/0190241 A1 | 8/2006 | Goutte et al. |
| 2007/0016400 A1 | 1/2007 | Soricutt et al. |
| 2007/0016401 A1 | 1/2007 | Ehsani et al. |
| 2007/0033001 A1 | 2/2007 | Muslea et al. |
| 2007/0050182 A1 | 3/2007 | Sneddon et al. |
| 2007/0078654 A1 | 4/2007 | Moore |
| 2007/0078845 A1 | 4/2007 | Scott et al. |
| 2007/0083357 A1 | 4/2007 | Moore et al. |
| 2007/0094169 A1 | 4/2007 | Yamada et al. |
| 2007/0112553 A1 | 5/2007 | Jacobson |
| 2007/0112555 A1 | 5/2007 | Lavi et al. |

(56) References Cited

U.S. PATENT DOCUMENTS

| | | |
|---|---|---|
| 2007/0112556 A1 | 5/2007 | Lavi et al. |
| 2007/0122792 A1 | 5/2007 | Galley et al. |
| 2007/0168202 A1 | 7/2007 | Changela et al. |
| 2007/0168450 A1 | 7/2007 | Prajapat et al. |
| 2007/0180373 A1 | 8/2007 | Bauman et al. |
| 2007/0219774 A1 | 9/2007 | Quirk et al. |
| 2007/0250306 A1 | 10/2007 | Marcu et al. |
| 2007/0265825 A1 | 11/2007 | Cancedda et al. |
| 2007/0265826 A1 | 11/2007 | Chen et al. |
| 2007/0269775 A1 | 11/2007 | Andreev et al. |
| 2007/0294076 A1 | 12/2007 | Shore et al. |
| 2008/0052061 A1 | 2/2008 | Kim et al. |
| 2008/0065478 A1 | 3/2008 | Kohlmeier et al. |
| 2008/0114583 A1 | 5/2008 | Al-Onaizan et al. |
| 2008/0154581 A1 | 6/2008 | Lavi et al. |
| 2008/0183555 A1 | 7/2008 | Walk |
| 2008/0215418 A1 | 9/2008 | Kolve et al. |
| 2008/0249760 A1 | 10/2008 | Marcu et al. |
| 2008/0270109 A1 | 10/2008 | Och |
| 2008/0270112 A1 | 10/2008 | Shimohata |
| 2008/0281578 A1 | 11/2008 | Kumaran et al. |
| 2008/0307481 A1 | 12/2008 | Panje |
| 2009/0076792 A1 | 3/2009 | Lawson-Tancred |
| 2009/0083023 A1 | 3/2009 | Foster et al. |
| 2009/0119091 A1 | 5/2009 | Sarig |
| 2009/0125497 A1 | 5/2009 | Jiang et al. |
| 2009/0234634 A1 | 9/2009 | Chen et al. |
| 2009/0241115 A1 | 9/2009 | Raffo et al. |
| 2009/0326912 A1 | 12/2009 | Ueffing |
| 2010/0017293 A1 | 1/2010 | Lung et al. |
| 2010/0042398 A1 | 2/2010 | Marcu et al. |
| 2010/0138213 A1 | 6/2010 | Bicici et al. |
| 2010/0174524 A1 | 7/2010 | Koehn |
| 2011/0029300 A1 | 2/2011 | Marcu et al. |
| 2011/0066643 A1 | 3/2011 | Cooper et al. |
| 2011/0082684 A1 | 4/2011 | Soricut et al. |
| 2012/0323554 A1 | 12/2012 | Hopkins et al. |

FOREIGN PATENT DOCUMENTS

| | | |
|---|---|---|
| EP | 0715265 A2 | 6/1996 |
| EP | 0933712 A2 | 8/1999 |
| EP | 0933712 A3 | 1/2001 |
| JP | 07244666 | 1/1995 |
| JP | 10011447 | 1/1998 |
| JP | 11272672 | 10/1999 |
| JP | 2004501429 | 1/2004 |
| JP | 2004062726 | 2/2004 |
| JP | 2008101837 | 5/2008 |
| JP | 5452868 | 1/2014 |
| WO | WO03083709 | 10/2003 |

OTHER PUBLICATIONS

McCallum, A. and Li, W. 2003. Early results for named entity recognition with conditional random fields, feature induction and web-enhanced lexicons. In Proceedings of the Seventh Conference on Natural Language Learning At HLT-NAACL 2003—vol. 4 (Edmonton, Canada). Association for Computational Linguistics, Morristown, NJ, 188-191.*

A. Agbago, R. Kuhn, and G. Foster. 2005. True-casing for the Portage system. In Recent Ad-vances in Natural Language Processing, pp. 21-24, Borovets, Bulgaria, Sep. 21-23, 2005.*

A. Arun, A. Axelrod, A. Birch Mayne, C. Callison-Burch, H. Hoang, P. Koehn, M. Osborne, and D. Talbot,"Edinburgh system description for the 2006 TC-STARspoken language translation evaluation," in TC-STARWorkshop on Speech-to-Speech Translation, Barcelona,Spain, Jun. 2006, pp. 37-41.*

Ruiqiang Zhang, Hirofumi Yamamoto, Michael Paul, HideoOkuma, Keiji Yasuda, Yves Lepage, Etienne Denoual, DaichiMochihashi, Andrew Finch,Eiichiro Sumita, "The NiCT-ATRStatistical Machine Translation System for the IWSLT 2006Evaluation," submitted to IWSLT, 2006.*

"Bangalore, S. and Rambow, O., "Using TAGs, a Tree Model, and a Language Model for Generation," May 2000,Workshop TAG+5, Paris."

Gale, W. and Church, K., "A Program for Aligning Sentences in Bilingual Corpora," 1993, Computational Linguisitcs, vol. 19, No. 1, pp. 75-102.

Ueffing et al., "Using Pos Information for Statistical Machine Translation into Morphologically Rich Languages," In EACL, 2003: Proceedings of the Tenth Conference on European Chapter of the Association for Computational Linguistics, pp. 347-354.

Frederking et al., "Three Heads are Better Than One," In Proceedings of the 4th Conference on Applied Natural Language Processing, Stuttgart, Germany, 1994, pp. 95-100.

Och et al., "Discriminative Training and Maximum Entropy Models for Statistical Machine Translation," In Proc. of the 40th Annual Meeting of the Association for Computational Linguistics (ACL), Philadelphia, PA, 2002.

Yasuda et al., "Automatic Machine Translation Selection Scheme to Output the Best Result," Proc of LREC, 2002, pp. 525-528.

Papineni et al., "Bleu: a Method for Automatic Evaluation of Machine Translation", Proc. of the 40th Annual Meeting of the Association for Computational Linguistics (ACL), Jul. 2002, pp. 311-318.

Shaalan et al., "Machine Translation of English Noun Phrases into Arabic", (2004), vol. 17, No. 2, International Journal of Computer Processing of Oriental Languages, 14 pages.

Isahara et al., "Analysis, Generation and Semantic Representation in CONTRAST—A Context-Based Machine Translation System", 1995, Systems and Computers in Japan, vol. 26, No. 14, pp. 37-53.

Proz.com, Rates for proofreading versus Translating, http://www.proz.com/forum/business__issues/202-rates__for__proofreading__versus__translating.html, Apr. 23, 2009, retrieved Jul. 13, 2012.

Celine, Volume discounts on large translation project, naked translations, http://www.nakedtranslations.com/en/2007/volume-discounts-on-large-translation-projects/, Aug. 1, 2007, retrieved Jul. 16, 2012.

Graehl, J and Knight, K, May 2004, Training Tree Transducers, In NAACL-HLT (2004), pp. 105-112.

Niessen et al, "Statistical machine translation with scarce resources using morphosyntactic information", Jun. 2004, Computational Linguistics, vol. 30, issue 2, pp. 181-204.

Liu et al., "Context Discovery Using Attenuated Bloom Filters in Ad-Hoc Networks," Springer, pp. 13-25, 2006.

First Office Action mailed Jun. 7, 2004 in Canadian Patent Application 2408819, filed May 11, 2001.

First Office Action mailed Jun. 14, 2007 in Canadian Patent Application 2475857, filed Mar. 11, 2003.

Office Action mailed Mar. 26, 2012 in German Patent Application 10392450.7, filed Mar. 28, 2003.

First Office Action mailed Nov. 5, 2008 in Canadian Patent Application 2408398, filed Mar. 27, 2003.

Second Office Action mailed Sep. 25, 2009 in Canadian Patent Application 2408398, filed Mar. 27, 2003.

First Office Action mailed Mar. 1, 2005 in European Patent Application No. 03716920.8, filed Mar. 27, 2003.

Second Office Action mailed Nov. 9, 2006 in European Patent Application No. 03716920.8, filed Mar. 27, 2003.

Third Office Action mailed Apr. 30, 2008 in European Patent Application No. 03716920.8, filed Mar. 27, 2003.

Office Action mailed Oct. 25, 2011 in Japanese Patent Application 2007-536911 filed Oct. 12, 2005.

Office Action mailed Jul. 24, 2012 in Japanese Patent Application 2007-536911 filed Oct. 12, 2005.

Final Office Action mailed Apr. 9, 2013 in Japanese Patent Application 2007-536911 filed Oct. 12, 2005.

Office Action mailed May 13, 2005 in Chinese Patent Application 1812317.1, filed May 11, 2001.

Office Action mailed Apr. 21, 2006 in Chinese Patent Application 1812317.1, filed May 11, 2001.

Office Action mailed Jul. 19, 2006 in Japanese Patent Application 2003-577155, filed Mar. 11, 2003.

Office Action mailed Mar. 1, 2007 in Chinese Patent Application 3805749.2, filed Mar. 11, 2003.

(56) References Cited

OTHER PUBLICATIONS

Office Action mailed Feb. 27, 2007 in Japanese Patent Application 2002-590018, filed May 13, 2002.
Office Action mailed Jan. 26, 2007 in Chinese Patent Application 3807018.9, filed Mar. 27, 2003.
Office Action mailed Dec. 7, 2005 in Indian Patent Application 2283/DELNP/2004, filed Mar. 11, 2003.
Office Action mailed Mar. 31, 2009 in European Patent Application 3714080.3, filed Mar. 11, 2003.
Agichtein et al., "Snowball: Extracting Information from Large Plain-Text Collections," ACM DL '00, the Fifth ACM Conference on Digital Libraries, Jun. 2, 2000, San Antonio, TX, USA.
Satake, Masaomi, "Anaphora Resolution for Named Entity Extraction in Japanese Newspaper Articles," Master's Thesis [online], Feb. 15, 2002, School of Information Science, JAIST, Nomi, Ishikaw, Japan.
Office Action mailed Aug. 29, 2006 in Japanese Patent Application 2003-581064, filed Mar. 27, 2003.
Office Action mailed Jan. 26, 2007 in Chinese Patent Application 3807027.8, filed Mar. 28, 2003.
Office Action mailed Jul. 25, 2006 in Japanese Patent Application 2003-581063, filed Mar. 28, 2003.
Huang et al., "A syntax-directed translator with extended domain of locality," Jun. 9, 2006, In Proceedings of the Workshop on Computationally Hard Problems and Joint Inference in Speech and Language Processing, pp. 1-8, New York City, New York, Association for Computational Linguistics.
Melamed et al., "Statistical machine translation by generalized parsing," 2005, Technical Report 05-001, Proteus Project, New York University, http://nlp.cs.nyu.edu/pubs/.
Galley et al., "Scalable Inference and Training of Context-Rich Syntactic Translation Models," Jul. 2006, In Proceedings of the 21st International Conference on Computational Linguistics and 44th Annual Meeting of the ACL, pp. 961-968.
Huang et al., "Statistical syntax-directed translation with extended domain of locality," Jun. 9, 2006, In Proceedings of AMTA, pp. 1-8.
Huang et al. Automatic Extraction of Named Entity Translingual Equivalence Based on Multi-Feature Cost Minimization. In Proceedings of the ACL 2003 Workshop on Multilingual and Mixed-Language Name Entry Recognition.
Langlais, P. et al., "TransType: a Computer-Aided Translation Typing System" EmbedMT '00 ANLP-NAACL 2000 Workshop: Embedded Machine Translation Systems, 2000, pp. 46-51. <http://acl.ldc.upenn.edu/W/W00/W00-0507.pdf>.
Alshawi, Hiyan, "Head Automata for Speech Translation", Proceedings of the ICSLP 96, 1996, Philadelphia, Pennsylvania.
Ambati, V., "Dependency Structure Trees in Syntax Based Machine Translation," Spring 2008 Report <http://www.cs.cmu.edu/~vamshi/publications/DependencyMT_report.pdf>, pp. 1-8.
Ballesteros, L. et al., "Phrasal Translation and Query Expansion Techniques for Cross-Language Information," SIGIR 97, Philadelphia, PA, © 1997, pp. 84-91.
Bannard, C. and Callison-Burch, C., "Paraphrasing with Bilingual Parallel Corpora," In Proceedings of the 43rd Annual Meeting on Association for Computational Linguistics (Ann Arbor, MI, Jun. 25-30, 2005). Annual Meeting of the ACL Assoc. for Computational Linguistics, Morristown, NJ, 597-604. DOI=http://dx.doi.org/10.3115/1219840.
Berhe, G. et al., "Modeling Service-baed Multimedia Content Adaptation in Pervasive Computing," CF '04 (Ischia, Italy) Apr. 14-16, 2004, pp. 60-69.
Boitet, C. et al., "Main Research Issues in Building Web Services," Proc. of the 6th Symposium on Natural Language Processing, Human and Computer Processing of Language and Speech, © 2005, pp. 1-11.
Brill, Eric, "Transformation-Based Error-Driven Learning and Natural Language Processing: A Case Study in Part of Speech Tagging", 1995, Association for Computational Linguistics, vol. 21, No. 4, pp. 1-37.

Callison-Burch, C. et al., "Statistical Machine Translation with Word- and Sentence-aligned Parallel Corpora," In Proceedings of the 42nd Meeting on Assoc. for Computational Linguistics (Barcelona, Spain, Jul. 21-26, 2004) Annual Meeting of the ACL. Assoc. for Computational Linguistics, Morristown, NJ, 1.
Cheng, P. et al., "Creating Multilingual Translation Lexicons with Regional Variations Using Web Corpora," In Proceedings of the 42nd Annual Meeting on Assoc. for Computational Linguistics (Barcelona, Spain, Jul. 21-26, 2004). Annual Meeting of the ACL. Assoc. for Computational Linguistics, Morristown, NJ, 53.
Cheung et al., "Sentence Alignment in Parallel, Comparable, and Quasi-comparable Corpora", In Proceedings of LREC, 2004, pp. 30-33.
Cohen et al., "Spectral Bloom Filters," SIGMOD 2003, Jun. 9-12, 2003, ACM pp. 241-252.
Cohen, "Hardware-Assisted Algorithm for Full-text Large-dictionary String Matching Using n-gram Hashing," 1998, Information Processing and Management, vol. 34, No. 4, pp. 443-464.
Covington, "An Algorithm to Align Words for Historical Comparison", Computational Linguistics, 1996, 22(4), pp. 481-496.
Eisner, Jason, "Learning Non-Isomorphic Tree Mappings for Machine Translation," 2003, in Proc. of the 41st Meeting of the ACL, pp. 205-208.
Fleming, Michael et al., "Mixed-Initiative Translation of Web Pages," AMTA 2000, LNAI 1934, Springer-Verlag, Berlin, Germany, 2000, pp. 25-29.
Franz Josef Och, Hermann Ney: "Improved Statistical Alignment Models" ACLOO:Proc. of the 38th Annual Meeting of the Association for Computational Lingustics, 'Online! Oct. 2-6, 2000, pp. 440-447, XP002279144 Hong Kong, China Retrieved from the Internet: <URL:http://www-i6.informatik.rwth-aachen.de/Colleagues/och/ACLOO.ps> retrieved on May 6, 2004! abstract.
Fuji, Ren and Hongchi Shi, "Parallel Machine Translation: Principles and Practice," Engineering of Complex Computer Systems, 2001 Proceedings, Seventh IEEE Int'l Conference, pp. 249-259, 2001.
Fung et al, "Mining Very-non parallel corpora: Parallel sentence and lexicon extractioin via bootstrapping and EM", In EMNLP 2004.
Gale, W. and Church, K., "A Program for Aligning Sentences in Bilingual Corpora," 1993, Computational Linguistics, vol. 19, No. 1, pp. 177-184.
Galley et al., "Scalable Inference and Training of Context-Rich Syntactic Translation Models," Jul. 2006, in Proc. of the 21st International Conference on Computational Linguistics, pp. 961-968.
Galley et al., "What's in a translation rule?", 2004, in Proc. of HLT/NAACL '04, pp. 1-8.
Gaussier et al, "A Geometric View on Bilingual Lexicon Extraction from Comparable Corpora", In Proceedings of ACL Jul. 2004.
Gildea, D., "Loosely Tree-based Alignment for Machine Translation," In Proceedings of the 41st Annual Meeting on Assoc. for Computational Linguistics—vol. 1 (Sapporo, Japan, Jul. 7-12, 2003). Annual Meeting of the ACL Assoc. for Computational Linguistics, Morristown, NJ, 80-87. DOI=http://dx.doi.org/10.3115/1075096.1075107.
Grossi et al, "Suffix Trees and their applications in string algorithms", In. Proceedings of the 1st South American Workshop on String Processing, Sep. 1993, pp. 57-76.
Gupta et al., "Kelips: Building an Efficient and Stable P2P DHT thorough Increased Memory and Background Overhead," 2003 IPTPS, LNCS 2735, pp. 160-169.
Habash, Nizar, "The Use of a Structural N-gram Language Model in Generation-Heavy Hybrid Machine Translation," University of Maryland, Univ. Institute for Advance Computer Studies, Sep. 8, 2004.
Huang et al., "Relabeling Syntax Trees to Improve Syntax-Based Machine Translation Quality," Jun. 4-9, 2006, in Proc. of the Human Language Technology Conference of the North American Chapter of the ACL, pp. 240-247.
Imamura et al., "Feedback Cleaning of Machine Translation Rules Using Automatic Evaluation," 2003 Computational Linguistics, pp. 447-454.
Klein et al., "Accurate Unlexicalized Parsing," Jul. 2003m, in Proc. of the 41st Annual Meeting of the ACL, pp. 423-430.

(56) References Cited

OTHER PUBLICATIONS

Koehn, Philipp, "Noun Phrase Translation," A PhD Dissertation for the University of Southern California, pp. xiii, 23, 25-57, 72-81, Dec. 2003.
Kupiec, Julian, "An Algorithm for Finding Noun Phrase Correspondences in Bilingual Corpora," In Proceedings of the 31st Annual Meeting of the ACL, 1993, pp. 17-22.
Lee-Y.S.,"Neural Network Approach to Adaptive Learning: with an Application to Chinese Homophone Disambiguation," IEEE pp. 1521-1526, 2001.
Llitjos, A. F. et al., "The Translation Correction Tool: English-Spanish User Studies," Citeseer © 2004, downloaded from: http://gs37.sp.cs.cmu.edu/ari/papers/lrec04/fontll, pp. 1-4.
McDevitt, K. et al., "Designing of a Community-based Translation Center," Technical Report TR-03-30, Computer Science, Virginia Tech, © 2003, pp. 1-8.
Metze, F. et al., "The NESPOLE! Speech-to-Speech Translation System," Proc. of the HLT 2002, 2nd Int'l Conf. on Human Language Technology (San Francisco, CA), © 2002, pp. 378-383.
Mohri, Mehryar, "Regular Approximation of Context Free Grammars Through Transformation", 2000, pp. 251-261, "Robustness in Language and Speech Technology", Chapter 9, Kluwer Academic Publishers.
Nagao, K. et al., "Semantic Annotation and Transcoding: Making Web Content More Accessible," IEEE Multimedia, vol. 8, Issue 2 Apr.-Jun. 2001, pp. 69-81.
Norvig, Peter, "Techniques for Automatic Memoization with Applications to Context-Free Parsing", Compuational Linguistics,1991, pp. 91-98, vol. 17, No. 1.
Och et al. "A Smorgasbord of Features for Statistical Machine Translation." HLTNAACL Conference. Mar. 2004, 8 pages.
Och, F., "Minimum Error Rate Training in Statistical Machine Translation," In Proceedings of the 41st Annual Meeting on Assoc. for Computational Linguistics—vol. 1 (Sapporo, Japan, Jul. 7-12, 2003). Annual Meeting of the ACL. Assoc. for Computational Linguistics, Morristown, NJ, 160-167. DOI= http://dx.doi.org/10.3115/1075096.
Och, F. and Ney, H., "A Systematic Comparison of Various Statistical Alignment Models," Computational Linguistics, 2003, 29:1, 19-51.
Perugini, Saviero et al., "Enhancing Usability in CITIDEL: Multimodal, Multilingual and Interactive Visualization Interfaces," JCDL '04, Tucson, AZ, Jun. 7-11, 2004, pp. 315-324.
Petrov et al., "Learning Accurate, Compact and Interpretable Tree Annotation," Jun. 4-9, 2006, in Proc. of the Human Language Technology Conference of the North American Chapter of the ACL, pp. 433-440.
Qun, Liu, "A Chinese-English Machine Translation System Based on Micro-Engine Architecture," An Int'l. Conference on Translation and Information Technology, Hong Kong, Dec. 2000, pp. 1-10.
Rayner et al.,"Hybrid Language Processing in the Spoken Language Translator," IEEE, pp. 107-110, 1997.
Rogati et al., "Resource Selection for Domain-Specific Cross-Lingual IR," ACM 2004, pp. 154-161.
Kumar, S. and Byrne, W., "Minimum Bayes-Risk Decoding for Statistical Machine Translation." HLTNAACL Conference. Mar. 2004, 8 pages.
Shirai, S., "A Hybrid Rule and Example-based Method for Machine Translation," NTT Communication Science Laboratories, pp. 1-5, 1997.
Tanaka, K. and Iwasaki, H. "Extraction of Lexical Translations from Non-Aligned Corpora," Proceedings of COLING 1996.
Taskar, B., et al., "A Discriminative Matching Approach to Word Alignment," In Proceedings of the Conference on Human Language Technology and Empirical Methods in Natural Language Processing (Vancouver, BC, Canada, Oct. 6-8, 2005). Human Language Technology Conference. Assoc. for Computational Linguistics, Morristown, NJ.
Tomas, J., "Binary Feature Classification for word Disambiguation in Statistical Machine Translation," Proceedings of the 2nd Int'l. Workshop on Pattern Recognition, 2002, pp. 1-12.
Uchimoto, K. et al., "Word Translation by Combining Example-based Methods and Machine Learning Models," Natural Language Processing (Shizen Gengo Shori), vol. 10, No. 3, Apr. 2003, pp. 87-114.
Uchimoto, K. et al., "Word Translation by Combining Example-based Methods and Machine Learning Models,"Natural Language Processing (Shizen Gengo Shori), vol. 10, No. 3, Apr. 2003, pp. 87-114. (English Translation).
Varga et al. "Parallel corpora for medium density languages", In Proceedings of RANLP 2005, pp. 590-596.
Yamada K., "A Syntax-Based Statistical Translation Model," 2002 PhD Dissertation, pp. 1-141.
Yamamoto et al., "Acquisition of Phrase-level Bilingual Correspondence using Dependency Structure" In Proceedings of COLING—2000, pp. 933-939.
Zhang et al., "Synchronous Binarization for Machine Translations," Jun. 4-9, 2006, in Proc. of the Human Language Technology Conference of the North American Chapter of the ACL, pp. 256-263.
Zhang et al., "Distributed Language Modeling for N-best List Reranking," In Proceedings of the 2006 Conference on Empirical Methods in Natural Language Processing (Sydney, Australia, Jul. 22-23, 2006). ACL Workshops. Assoc. for Computational Linguistics, Morristown, NJ, 216-223.
Patent Cooperation Treaty International Preliminary Report on Patentability and The Written Opinion, International application No. PCT/US2008/004296, Oct. 6, 2009, 5 pgs.
Documnet, Wikipedia.com, web.archive.org (Feb. 24, 2004) <http://web.archive.org/web/20040222202831 /http://en.wikipedia.org/wikiiDocument>, Feb. 24, 2004.
Identifying, Dictionary.com, wayback.archive.org (Feb. 28, 2007) <http://wayback.archive.org/web/200501 01.OOOOOO*/http:////dictionary.reference.com//browse//identifying>, Feb. 28, 2005 <http://web.archive.org/web/20070228150533/http://dictionary.reference.com/browse/identifying>.
Koehn, P., et al, "Statistical Phrase-Based Translation," Proceedings of of HLT-NAACL 2003 Main Papers , pp. 48-54 Edmonton, May-Jun. 2003.
Abney, S.P., "Stochastic Attribute Value Grammars", Association for Computional Linguistics, 1997, pp. 597-618.
Fox, H., "Phrasal Cohesion and Statistical Machine Translation" Proceedings of the Conference on Empirical Methods in Natural Language Processing, Philadelphia, Jul. 2002, pp. 304-311. Association for Computational Linguistics. <URL: http://acl.ldc.upenn.edu/W/W02/W02-1039.pdf>.
Tillman, C., et al, "Word Reordering and a Dynamic Programming Beam Search Algorithm for Statistical Machine Translation" <URL: http://acl.ldc.upenn.edu/J/J03/J03-1005.pdf>, 2003.
Wang, W., et al. "Capitalizing Machine Translation" In HLT-NAACL '06 Proceedings Jun. 2006. <http://www.isi.edu/natural-language/mt/hlt-naac1-06-wang.pdf>.
Notice of Allowance mailed Dec. 10, 2013 in Japanese Patent Application 2007-536911, filed Oct. 12, 2005.
Abney, Stephen, "Parsing by Chunks," 1991, Principle-Based Parsing: Computation and Psycholinguistics, vol. 44, pp. 257-279.
Al-Onaizan et al., "Statistical Machine Translation," 1999, JHU Summer Tech Workshop, Final Report, pp. 1-42.
Al-Onaizan, Y. and Knight, K., "Named Entity Translation: Extended Abstract" 2002, Proceedings of HLT-02, San Diego, CA.
Al-Onaizan, Y. and Knight, K., "Translating Named Entities Using Monolingual and Bilingual Resources," 2002, Proc. of the 40th Annual Meeting of the ACL,pp. 400-408.
Al-Onaizan et al., "Translating with Scarce Resources," 2000, 17th National Conference of the American Association for Artificial Intelligence, Austin, TX, pp. 672-678.
Alshawi et al., "Learning Dependency Translation Models as Collections of Finite-State Head Transducers," 2000, Computational Linguistics, vol. 26, pp. 45-60.
Arbabi et al., "Algorithms for Arabic name transliteration," Mar. 1994, IBM Journal of Research and Development, vol. 38, Issue 2, pp. 183-194.
Barnett et al., "Knowledge and Natural Language Processing," Aug. 1990, Communications of the ACM, vol. 33, Issue 8, pp. 50-71.

(56) References Cited

OTHER PUBLICATIONS

Bangalore, S. and Rambow, O., "Corpus-Based Lexical Choice in Natural Language Generation," 2000, Proc. of the 38th Annual ACL, Hong Kong, pp. 464-471.
Bangalore, S. and Rambow, O., "Exploiting a Probabilistic Hierarchical Model for Generation, " 2000, Proc. of 18th conf. on Computational Linguistics, vol. 1, pp. 42-48.
Bangalore, S. and Rambow, O., "Evaluation Metrics for Generation," 2000, Proc. of the 1st International Natural Language Generation Conf., vol. 14, p. 1-8.
Bangalore, S. and Rambow, O., "Using TAGs, a Tree Model, and a Language Model for Generation," May 2000, Workshop TAG+5, Paris.
Baum, Leonard, "An Inequality and Associated Maximization Technique in Statistical Estimation for Probabilistic Functions of Markov Processes", 1972, Inequalities 3:1-8.
Bikel et al., "An Algorithm that Learns What's in a Name," 1999, Machine Learning Journal Special Issue on Natural Language Learning, vol. 34, pp. 211-232.
Brants, Thorsten, "TnT—A Statistical Part-of-Speech Tagger," 2000, Proc. of the 6th Applied Natural Language Processing Conference, Seattle.
Brill, Eric. "Transformation-Based Error-Driven Learning and Natural Language Processing: A Case Study in Part of Speech Tagging", 1995, Computational Linguistics, vol. 21, No. 4, pp. 543-565.
Brown et al., "A Statistical Approach to Machine Translation," Jun. 1990, Computational Linguistics, vol. 16, No. 2, pp. 79-85.
Brown, Ralf, "Automated Dictionary Extraction for "Knowledge-Free" Example-Based Translation," 1997, Proc. of 7th Int'l Conf. on Theoretical and Methodological Issues in MT, Santa Fe, NM, pp. 111-118.
Brown et al., "The Mathematics of Statistical Machine Translation: Parameter Estimation," 1993, Computational Linguistics, vol. 19, Issue 2, pp. 263-311.
Brown et al., "Word-Sense Disambiguation Using Statistical Methods," 1991, Proc. of 29th Annual ACL, pp. 264-270.
Carl, Michael. "A Constructivist Approach to Machine Translation," 1998, New Methods of Language Processing and Computational Natural Language Learning, pp. 247-256.
Chen, K. and Chen, H., "Machine Translation: An Integrated Approach," 1995, Proc. of 6th Int'l Conf. on Theoretical and Methodological Issue in MT, pp. 287-294.
Chinchor, Nancy, "MUC-7 Named Entity Task Definition," 1997, Version 3.5.
Clarkson, P. and Rosenfeld, R., "Statistical Language Modeling Using the CMU-Cambridge Toolkit", 1997, Proc. ESCA Eurospeech, Rhodes, Greece, pp. 2707-2710.
Corston-Oliver, Simon, "Beyond String Matching and Cue Phrases: Improving Efficiency and Coverage in Discourse Analysis",1998, The AAAI Spring Symposium on Intelligent Text Summarization, pp. 9-15.
Dagan, I. and Itai, A., "Word Sense Disambiguation Using a Second Language Monolingual Corpus", 1994, Computational Linguistics, vol. 20, No. 4, pp. 563-596.
Dempster et al., "Maximum Likelihood from Incomplete Data via the EM Algorithm", 1977, Journal of the Royal Statistical Society, vol. 39, No. 1, pp. 1-38.
Diab, M. and Finch, S., "A Statistical Word-Level Translation Model for Comparable Corpora," 2000, In Proc.of the Conference on ContentBased Multimedia Information Access (RIAO).
Elhadad, M. and Robin, J., "An Overview of SURGE: a Reusable Comprehensive Syntactic Realization Component," 1996, Technical Report 96-03, Department of Mathematics and Computer Science, Ben Gurion University, Beer Sheva, Israel.
Elhadad, M. and Robin, J., "Controlling Content Realization with Functional Unification Grammars", 1992, Aspects of Automated Natural Language Generation, Dale et al. (eds)., Springer Verlag, pp. 89-104.
Elhadad et al., "Floating Constraints in Lexical Choice", 1996, ACL, 23(2): 195-239.
Elhadad, Michael, "FUF: the Universal Unifier User Manual Version 5.2", 1993, Department of Computer Science, Ben Gurion University, Beer Sheva, Israel.
Elhadad. M. and Robin, J., "SURGE: a Compi:ehensive Plug-in Syntactic Realization Component for Text Generation", 1999 (available at http://www.cs.bgu.ac.il/~elhadad/pub.html).
Elhadad, Michael, "Using Argumentation to Control Lexical Choice: A Functional Unification Implementation", 1992, Ph.D. Thesis, Graduate School of Arts and Sciences, Columbia University.
Fung, Pascale, "Compiling Bilingual Lexicon Entries From a Non-Parallel English-Chinese Corpus", 1995, Proc. of the Third Workshop on Very Large Corpora, Boston, MA, pp. 173-183.
Fung, P. and Yee, L., "An IR Approach for Translating New Words from Nonparallel, Comparable Texts", 1998, 36th Annual Meeting of the ACL, 17th International Conference on Computational Linguistics, pp. 414-420.
Gale, W. and Church, K., "A Program for Aligning Sentences in Bilingual Corpora," 1991, 29th Annual Meeting of the ACL, pp. 177-183.
Germann, Ulrich, "Building a Statistical Machine Translation System from Scratch: How Much Bang for the Buck Can We Expect?" Proc. of the Data-Driven MT Workshop of ACL-01, Toulouse, France, 2001.
Germann et al., "Fast Decoding and Optimal Decoding for Machine Translation", 2001, Proc. of the 39th Annual Meeting of the ACL, Toulouse, France, pp. 228-235.
Diab, Mona, "An Unsupervised Method for Multilingual Word Sense Tagging Using Parallel Corpora: A Preliminary Investigation", 2000, SIGLEX Workshop on Word Senses and Multi-Linguality, pp. 1-9.
Grefenstette, Gregory, "The World Wide Web as a Resource for Example-Based Machine Translation Tasks", 1999, Translating and the Computer 21, Proc. of the 21st International Conf. on Translating and the Computer, London, UK, 12 pp.
Hatzivassiloglou, V. et al., "Unification-Based Glossing", 1995, Proc. of the International Joint Conference on Artificial Intelligence, pp. 1382-1389.
Ide, N. and Veronis, J., "Introduction to the Special Issue on Word Sense Disambiguation: The State of the Art", Mar. 1998, Computational Linguistics, vol. 24, Issue 1, pp. 2-40.
Imamura, Kenji, "Hierarchical Phrase Alignment Harmonized with Parsing", 2001, in Proc. of NLPRS, Tokyo.
Jelinek, F., "Fast Sequential Decoding Algorithm Using a Stack", Nov. 1969, IBM J. Res. Develop., vol. 13, No. 6, pp. 675-685.
Jones, K. Sparck, "Experiments in Relevance Weighting of Search Terms", 1979, Information Processing & Management, vol. 15, Pergamon Press Ltd., UK, pp. 133-144.
Knight, K. and Yamada, K., "A Computational Approach to Deciphering Unknown Scripts," 1999, Proc. of the ACL Workshop on Unsupervised Learning in Natural Language Processing.
Knight, K. and Al-Onaizan, Y., "A Primer on Finite-State Software for Natural Language Processing", 1999 (available at http://www.isi.edu/licensed-sw/carmel).
Knight, Kevin, "A Statistical MT Tutorial Workbook," 1999, JHU Summer Workshop (available at http://www.isi.edu/natural-language/mt/wkbk.rtf).
Knight, Kevin, "Automating Knowledge Acquisition for Machine Translation," 1997, Al Magazine 18(4).
Knight, K. and Chander, I., "Automated Postediting of Documents,"1994, Proc. of the 12th Conference on Artificial Intelligence, pp. 779-784.
Knight, K. and Luk, S., "Building a Large-Scale Knowledge Base for Machine Translation," 1994, Proc. of the 12th Conference on Artificial Intelligence, pp. 773-778.
Knight, Kevin, "Connectionist Ideas and Algorithms," Nov. 1990, Communications of the ACM, vol. 33, No. 11, pp. 59-74.
Knight, Kevin, "Decoding Complexity in Word-Replacement Translation Models", 1999, Computational Linguistics, 25(4).
Knight et al., "Filling Knowledge Gaps in a Broad-Coverage Machine Translation System", 1995, Proc. of the14th International Joint Conference on Artificial Intelligence, Montreal, Canada, vol. 2, pp. 1390-1396.

(56) References Cited

OTHER PUBLICATIONS

Knight, Kevin, "Integrating Knowledge Acquisition and Language Acquisition," May 1992, Journal of Applied Intelligence, vol. 1, No. 4.

Knight et al., "Integrating Knowledge Bases and Statistics in MT," 1994, Proc. of the Conference of the Association for Machine Translation in the Americas.

Knight, Kevin, "Learning Word Meanings by Instruction,"1996, Proc. of the National Conference on Artificial Intelligence, vol. 1, pp. 447-454.

Knight, K. and Graehl, J., "Machine Transliteration", 1997, Proc. of the ACL-97, Madrid, Spain.

Knight, K. et al., "Machine Transliteration of Names in Arabic Text," 2002, Proc. of the ACL Workshop on Computational Approaches to Semitic Languages.

Knight, K. and Marcu, D., "Statistics-Based Summarization—Step One: Sentence Compression," 2000, American Association for Artificial Intelligence Conference, pp. 703-710.

Knight et al., "Translation with Finite-State Devices," 1998, Proc. of the 3rd AMTA Conference, pp. 421-437.

Knight, K. and Hatzivassiloglou, V., "Two-Level, Many-Paths Generation," 1995, Proc. of the 33rd Annual Conference of the ACL, pp. 252-260.

Knight, Kevin, "Unification: A Multidisciplinary Survey," 1989, ACM Computing Surveys, vol. 21, No. 1.

Koehn, P. and Knight, K., "ChunkMT: Statistical Machine Translation with Richer Linguistic Knowledge," Apr. 2002, Information Sciences Institution.

Koehn, P. and Knight, K., "Estimating Word Translation Probabilities from Unrelated Monolingual Corpora Using the EM Algorithm," 2000, Proc. of the 17th meeting of the AAAI.

Koehn, P. and Knight, K., "Knowledge Sources for Word-Level Translation Models," 2001, Conference on Empirical Methods in Natural Language Processing.

Kurohashi, S. and Nagao, M., "Automatic Detection of Discourse Structure by Checking Surface Information in Sentences," 1994, Proc. of COL-LING '94, vol. 2, pp. 1123-1127.

Langkilde-Geary, Irene, "An Empirical Verification of Coverage and Correctness for a General-Purpose Sentence Generator," 1998, Proc. 2nd Int'l Natural Language Generation Conference.

Langkilde-Geary, Irene, "A Foundation for General-Purpose Natural Language Generation: Sentence Realization Using Probabilistic Models of Language," 2002, Ph.D. Thesis, Faculty of the Graduate School, University of Southern California.

Langkilde, Irene, "Forest-Based Statistical Sentence Generation," 2000, Proc. of the 1st Conference on North American chapter of the ACL, Seattle, WA, pp. 170-177.

Langkilde, I. and Knight, K., "The Practical Value of N-Grams in Generation," 1998, Proc. of the 9th International Natural Language Generation Workshop, p. 248-255.

Langkilde, I. and Knight, K., "Generation that Exploits Corput-Based Statistical Knowledge," 1998, Proc. of the COLING—ACL, pp. 704-710.

Mann, G. and Yarowsky, D., "Multipath Translation Lexicon Induction via Bridge Languages," 2001, Proc. of the 2nd Conference of the North American Chapter of the ACL, Pittsburgh, PA, pp. 151-158.

Manning, C. and Schutze, H., "Foundations of Statistical Natural Language Processing," 2000, The MIT Press, Cambridge, MA [redacted].

Marcu, D. and Wong, W., "A Phrase-Based, Joint Probability Model for Statistical Machine Translation," 2002, Proc. of ACL-2 conference on Empirical Methods in Natural Language Processing, vol. 10, pp. 133-139.

Marcu, Daniel, "Building Up Rhetorical Structure Trees," 1996, Proc. of the National Conference on Artificial Intelligence and Innovative Applications of Artificial Intelligence Conference, vol. 2, pp. 1069-1074.

Marcu, Daniel, "Discourse trees are good indicators of importance in text," 1999, Advances in Automatic Text Summarization, The MIT Press, Cambridge, MA.

Marcu, Daniel, "Instructions for Manually Annotating the Discourse Structures of Texts," 1999, Discourse Annotation, pp. 1-49.

Marcu, Daniel, "The Rhetorical Parsing of Natural Language Texts," 1997, Proceedings of ACL/EACL '97, pp. 96-103.

Marcu, Daniel, "The Rhetorical Parsing, Summarization, and Generation of Natural Language Texts," 1997, Ph.D. Thesis, Graduate Department of Computer Science, University of Toronto.

Marcu, Daniel, "Towards a Unified Approach to Memory- and Statistical-Based Machine Translation," 2001, Proc. of the 39th Annual Meeting of the ACL, pp. 378-385.

Melamed, I. Dan, "A Word-to-Word Model of Translational Equivalence," 1997, Proc. of the 35th Annual Meeting of the ACL, Madrid, Spain, pp. 490-497.

Melamed, I. Dan, "Automatic Evaluation and Uniform Filter Cascades for Inducing N-Best Translation Lexicons," 1995, Proc. of the 3rd Workshop on Very Large Corpora, Boston, MA, pp. 184-198.

Melamed, I. Dan, "Empirical Methods for Exploiting Parallel Texts," 2001, MIT Press, Cambridge, MA [table of contents].

Meng et al., "Generating Phonetic Cognates to Handle Named Entities in English-Chinese Cross-Language Spoken Document Retrieval," 2001, IEEE Workshop on Automatic Speech Recognition and Understanding, pp. 311-314.

Miike et al., "A full-text retrieval system with a dynamic abstract generation function," 1994, Proceedings of SI-GIR '94, pp. 152-161.

Mikheev, A., "Named Entity Recognition without Gazeteers," 1999, Proc. of European Chapter of the ACL, Bergen, Norway, pp. 1-8.

Monasson et al., "Determining computational complexity from characteristic 'phase transitions'," Jul. 1999, Nature Magazine, vol. 400, pp. 133-137.

Mooney, Raymond, "Comparative Experiments on Disambiguating Word Senses: An Illustration of the Role of Bias in Machine Learning," 1996, Proc. of the Conference on Empirical Methods in Natural Language Processing, pp. 82-91.

Niessen,S. and Ney, H, "Toward hierarchical models for statistical machine translation of inflected languages," 2001, Data-Driven Machine Translation Workshop, Toulouse, France, pp. 47-54.

Och, F. and Ney, H, "Improved Statistical Alignment Models," 2000, 38th Annual Meeting of the ACL, Hong Kong, pp. 440-447.

Och et al., "Improved Alignment Models for Statistical Machine Translation," 1999, Proc. of the Joint Conf. of Empirical Methods in Natural Language Processing and Very Large Corpora, pp. 20-28.

Papineni et al., "Bleu: a Method for Automatic Evaluation of Machine Translation," 2001, IBM Research Report, RC22176.

Pla et al., "Tagging and Chunking with Bigrams," 2000, Proc. of the 18th Conference on Computational Linguistics, vol. 2, pp. 614-620.

Rapp, Reinhard, Automatic Identification of Word Translations from Unrelated English and German Corpora, 1999, 37th Annual Meeting of the ACL, pp. 519-526.

Rapp, Reinhard, "Identifying Word Translations in Non-Parallel Texts," 1995, 33rd Annual Meeting of the ACL, pp. 320-322.

Resnik, P. and Yarowsky, D., "A Perspective on Word Sense Disambiguation Methods and Their Evaluation," 1997, Proceedings of SIGLEX '97, Washington, DC, pp. 79-86.

Resnik, Philip, "Mining the Web for Bilingual Text," 1999, 37th Annual Meeting of the ACL, College Park, MD, pp. 527-534.

Rich, E. and Knight, K., "Artificial Intelligence, Second Edition," 1991, McGraw-Hill Book Company [redacted].

Richard et al., "Visiting the Traveling Salesman Problem with Petri nets and application in the glass industry," Feb. 1996, IEEE Emerging Technologies and Factory Automation, pp. 238-242.

Robin, Jacques, "Revision-Based Generation of Natural Language Summaries Providing Historical Background: Corpus-Based Analysis, Design Implementation and Evaluation," 1994, Ph.D. Thesis, Columbia University, New York.

Sang, E. and Buchholz, S., "Introduction to the CoNLL-2000 Shared Task: Chunking," 20002, Proc. of CoNLL-2000 and LLL-2000, Lisbon, Portugal, pp. 127-132.

Schmid, H., and Walde, S., "Robust German Noun Chunking With a Probabilistic Context-Free Grammar," 2000, Proc. of the 18th Conference on Computational Linguistics, vol. 2, pp. 726-732.

(56) References Cited

OTHER PUBLICATIONS

Selman et al., "A New Method for Solving Hard Satisfiability Problems," 1992, Proc. of the 10th National Conference on Artificial Intelligence, San Jose, CA, pp. 440-446.
Schutze, Hinrich, "Automatic Word Sense Discrimination," 1998, Computational Linguistics, Special Issue on Word Sense Disambiguation, vol. 24, Issue 1, pp. 97-123.
Sobashima et al., "A Bidirectional Transfer-Driven Machine Translation System for Spoken Dialogues," 1994, Proc. of 15th Conference on Computational Linguistics, vol. 1, pp. 64-68.
Shapiro, Stuart (ed.), "Encyclopedia of Artificial Intelligence, 2nd edition", vol. 2, 1992, John Wiley & Sons Inc; "Unification" article, K. Knight, pp. 1630-1637.
Soricut et al., "Using a large monolingual corpus to improve translation accuracy," 2002, Lecture Notes in Computer Science, vol. 2499, Proc. of the 5th Conference of the Association for Machine Translation in the Americas on Machine Translation: From Research to Real Users, pp. 155-164.
Stalls, B. and Knight, K., "Translating Names and Technical Terms in Arabic Text," 1998, Proc. of the COLING/ACL Workkshop on Computational Approaches to Semitic Language.
Sun et al., "Chinese Named Entity Identification Using Class-based Language Model," 2002, Proc. of 19th International Conference on Computational Linguistics, Taipei, Taiwan, vol. 1, pp. 1-7.
Sumita et al., "A Discourse Structure Analyzer for Japanese Text," 1992, Proc. of the International Conference on Flfth Generation Computer Systems, vol. 2, pp. 1133-1140.
Taylor et al., "The Penn Treebank: An Overview," in A. Abeill (ed.), Treebanks: Building and Using Parsed Corpora, 2003, pp. 5-22.
Tiedemann, Jorg, "Automatic Construction of Weighted String Similarity Measures," 1999, In Proceedings of the Joint SIGDAT Conference on Emperical Methods in Natural Language Processing and Very Large Corpora.
Tillmann et al., "A DP based Search Using Monotone Alignments in Statistical Translation," 1997, Proc. of the Annual Meeting of the ACL, pp. 366-372.
Tillman, C. and Xia, F., "A Phrase-Based Unigram Model for Statistical Machine Translation," 2003, Proc. of the North American Chapter of the ACL on Human Language Technology, vol. 2, pp. 106-108.
Veale, T. and Way, A., "Gaijin: A Bootstrapping, Template-Driven Approach to Example-Based MT," 1997, Proc. of New Methods in Natural Language Processing (NEMPLP97), Sofia, Bulgaria.
Vogel, S. and Ney, H., "Construction of a Hierarchical Translation Memory," 2000, Proc. of Cooling 2000, Saarbrucken, Germany, pp. 1131-1135.
Vogel et al., "The CMU Statistical Machine Translation System," 2003, Machine Translation Summit IX, New Orleans, LA.
Vogel et al., "The Statistical Translation Module in the Verbmobil System," 2000, Workshop on Multi-Lingual Speech Communication, pp. 69-74.
Wang, Ye-Yi, "Grammar Interference and Statistical Machine Translation," 1998, Ph.D Thesis, Carnegie Mellon University, Pittsburgh, PA.
Watanbe et al., "Statistical Machine Translation Based on Hierarchical Phrase Alignment," 2002, 9th International Conference on Theoretical and Methodological Issues in Machin Translation (TMI-2002), Keihanna, Japan, pp. 188-198.
Witbrock, M. and Mittal, V., "Ultra-Summarization: A Statistical Approach to Generating Highly Condensed Non-Extractive Summaries," 1999, Proc. of SIGIR '99, 22nd International Conference on Research and Development in Information Retrieval, Berkeley, CA, pp. 315-316.
Wang, Y. and Waibel, A., "Decoding Algorithm in Statistical Machine Translation," 1996, Proc. of the 35th Annual Meeting of the ACL, pp. 366-372.
Wu, Dekai, "Stochastic Inversion Transduction Grammars and Bilingual Parsing of Parallel Corpora," 1997, Computational Linguistics, vol. 23, Issue 3, pp. 377-403.
Wu, Dekai, "A Polynomial-Time Algorithm for Statistical Machine Translation," 1996, Proc. of 34th Annual Meeting of the ACL, pp. 152-158.
Yamada, K. and Knight, K., "A Decoder for Syntax-based Statistical MT," 2001, Proceedings of the 40th Annual Meeting of the ACL, pp. 303-310.
Yamada, K. and Knight, K. "A Syntax-based Statistical Translation Model," 2001, Proc. of the 39th Annual Meeting of the ACL, pp. 523-530.
Yamamoto et al., "A Comparative Study on Translation Units for Bilingual Lexicon Extraction," 2001, Japan Academic Association for Copyright Clearance, Tokyo, Japan.
Yarowsky, David, "Unsupervised Word Sense Disambiguation Rivaling Supervised Methods," 1995, 33rd Annual Meeting of the ACL, pp. 189-196.
Callan et al., "TREC and TIPSTER Experiments with INQUERY," 1994, Information Processing and Management, vol. 31, Issue 3, pp. 327-343.
Cohen, Yossi, "Interpreter for FUF," (available at ftp://ftp.cs.bgu.ac.il/pub/people/elhadad/fuf-life.lf).
Mohri, M. and Riley, M., "An Efficient Algorithm for the N-Best-Strings Problem," 2002, Proc. of the 7th Int. Conf. on Spoken Language Processing (ICSLP'02), Denver, CO, pp. 1313-1316.
Nederhof, M. and Satta, G., "IDL-Expressions: A Formalism for Representing and Parsing Finite Languages in Natural Language Processing," 2004, Journal of Artificial Intelligence Research, vol. 21, pp. 281-287.
Och, F. and Ney, H., "Discriminative Training and Maximum Entropy Models for Statistical Machine Translation," 2002, Proc. of the 40th Annual Meeting of the ACL, Philadelphia, PA, pp. 295-302.
Resnik, P. and Smith, A., "The Web as a Parallel Corpus," Sep. 2003, Computational Linguistics, Special Issue on Web as Corpus, vol. 29, Issue 3, pp. 349-380.
Russell, S. and Norvig, P., "Artificial Intelligence: A Modern Approach," 1995, Prentice-Hall, Inc., New Jersey [redacted—table of contents].
Ueffing et al., "Generation of Word Graphs in Statistical Machine Translation," 2002, Proc. of Empirical Methods in Natural Language Processing (EMNLP), pp. 156-163.
Kumar, R. and Li, H., "Integer Programming Approach to Printed Circuit Board Assembly Time Optimization," 1995, IEEE Transactions on Components, Packaging, and Manufacturing, Part B: Advance Packaging, vol. 18, No. 4, pp. 720-727.

* cited by examiner

SYSTEM AND METHOD FOR CAPITALIZING MACHINE TRANSLATED TEXT

BACKGROUND

1. Field of the Art

The present invention relates generally to machine translation, and more particularly to capitalizing machine translated text.

2. Description of Related Art

Capitalization is the process of recovering case information for texts in lowercase. Generally, capitalization improves the legibility of texts but does not affect the word choice or order. In natural language processing, a good capitalization model has been shown useful for name entity recognition, automatic content extraction, speech recognition, modern word processors, and an automatic translation system (sometimes referred to as a machine translation system or an MT system). Capitalization of output from the automatic translation system improves the comprehension of the automatically translated text in a target language.

Capitalization of automatically translated text may be characterized as a sequence labeling process. An input to such labeling process is a lowercase sentence. An output is a capitalization tag sequence. Unfortunately, associating capitalization tags with lowercase words can result in capitalization ambiguities (i.e., each lowercase word can have more than one tag).

One solution to resolve capitalization ambiguities for automatically translated text is a 1-gram tagger model, where the case of a word is estimated from a target language corpus with case information. Other solutions for capitalizing automatically translated text treat capitalization as a lexical ambiguity resolution problem. Still some solutions to resolve capitalization ambiguities include applying a maximum entropy Markov model (MEMM) and/or combining features of words, cases, and context (i.e., tag transitions) of the target language.

These solutions are monolingual because the solutions are estimated only from the target (monolingual) text. Unfortunately, such monolingual solutions may not always perform well on badly translated text and/or source text that includes capitalization based on special use.

SUMMARY

The present invention provides a method for capitalizing translated text. An exemplary method according to one embodiment includes automatically translating a capitalized source text to a target text, and capitalizing the target text according to the capitalized source text.

DETAILED DESCRIPTION

Various embodiments include translating a capitalized source sentence in a source language to a lowercase sentence in a target language using an automatic translation system, and capitalizing the lower case sentence according to information in the capitalized source sentence. The automatic translation system may generate a set of possible capitalized sentences for the lowercase sentence. In some embodiments, the automatic translation system parses the input sentence and the capitalized sentence into phrases and aligns the phrases to provide a phrase alignment. The automatic translation system may use the capitalization information from the capitalized input sentence in the source language, along with monolingual capitalization models based on the target lowercase sentence, and, optionally, the phrase alignment, to find a best capitalized sentence. The best capitalized sentence may be determined from a combination of a set of model features that include information from the input sentence in the source language.

Figure 1:
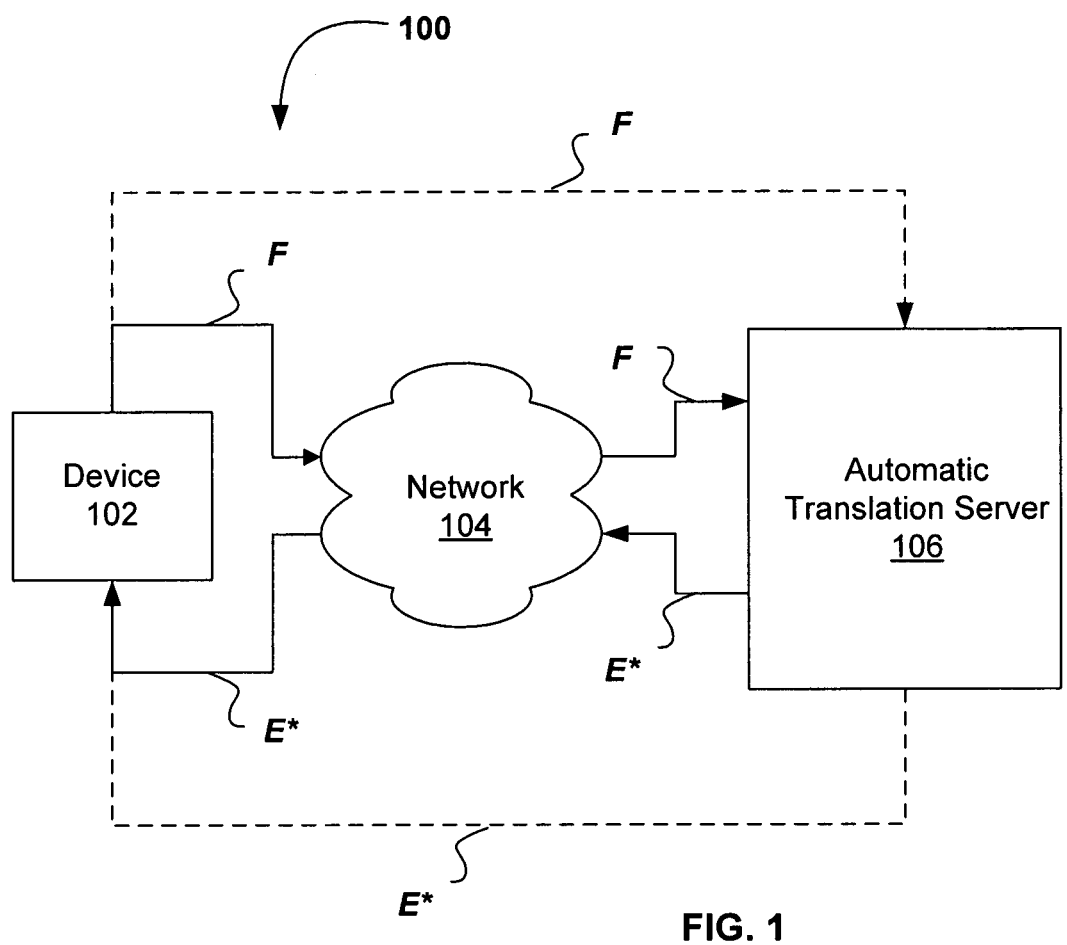
FIG. 1 illustrates an exemplary architecture for an exemplary machine translation system.

Turning now to FIG. 1, an exemplary architecture for an automatic machine translation system 100 is illustrated. The machine translation system 100 comprises an automatic translation server 106, a network 104, and a device 102. The device 102 may comprise any type of user or other device, such as, a laptop or desktop computer, a personal digital assistant (PDA), a cellular telephone, and so forth.

According to an exemplary embodiment, the device 102 is configured to communicate a capitalized input sentence, designated by F in FIG. 1, in a source language over the network 104 to the automatic translation server 106. The network 104 may comprise any type of network, such as a wide area network, a local area network, a peer to peer network, and so forth. According to an alternative embodiment, the device 102 communicates directly with the automatic translation server 106, rather than via the network 104.

The automatic translation server 106 is configured to receive the capitalized input sentence (F), translate the capitalized input sentence (F) from the source language to a target language, and return a best capitalized sentence, designated as E* in FIG. 1, in the target language over the network 104 to the device 102.

A sentence may comprise a string of characters representing units of speech (e.g., words, phrases, letters, symbols, punctuation, and the like) in a natural language. The sentence may be determined, for example, by rules of grammar. In various embodiments, the sentence comprises a character string of arbitrary length selected for processing by an automatic translation system.

Figure 2:
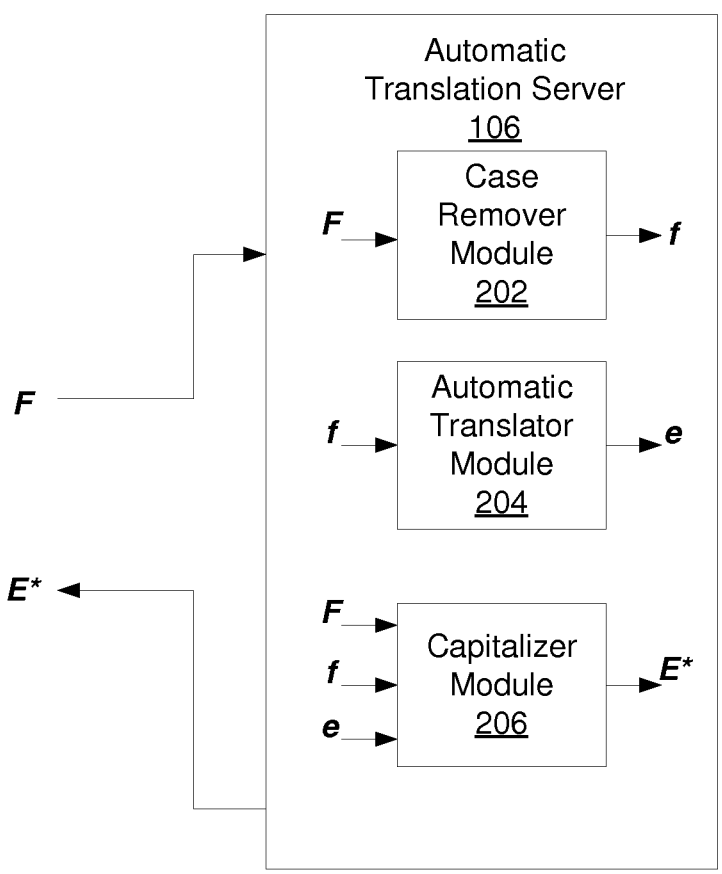
FIG. 2 illustrates a block diagram showing exemplary modules comprising the automatic translation server.

FIG. 2 illustrates a block diagram illustrating exemplary modules comprising the automatic translation server 106 of FIG. 1. The exemplary automatic translation server 106 comprises a case remover module 202, an automatic translator module 204, and a capitalizer module 206.

The case remover module 202 receives the capitalized input sentence (F) and generates a lowercase sentence, designated by $f$ in FIG. 2, in the source language (i.e., the lowercase source sentence). According to an exemplary embodiment, the case remover module 202 generates the lowercase source sentence by replacing all uppercase characters in the capitalized input sentence (F) with a corresponding lowercase character according to a lookup table.

The automatic translator module 204 is configured to receive the lowercase source sentence (e.g., $f$) and translate the lowercase source sentence from the source language to a lowercase sentence, designated by "e" in FIG. 2, in the target language (i.e., the lowercase target sentence). The translation is performed by a phrase based statistical automatic translation system, according to an exemplary embodiment. However, according to alternative embodiments, automatic translation may comprise a dictionary based automatic translation system, a syntax based automatic translation system, or any combination of automatic translation systems.

The capitalizer module 206 is configured to receive the capitalized input sentence F in the source language, along with the lowercase target sentence (e.g., e) from the automatic translator module 204, and the lowercase source sentence (e.g., $f$). The capitalizer module 206 determines the best capitalized sentence (e.g., E*) based on capitalization information in the capitalized input sentence (e.g., F). Any type of process for determining the best capitalized sentence may be employed. For example, conditional random fields, discussed in more detail in associated with FIG. 4, may be utilized to determine the best capitalized sentence. The capitalizer module 206 also utilizes information in the lowercase target sentence.

Although various modules are shown in association with the automatic translation server 106, fewer or more modules may comprise the automatic translation server 106 and still fall within the scope of various embodiments.

Figure 3:
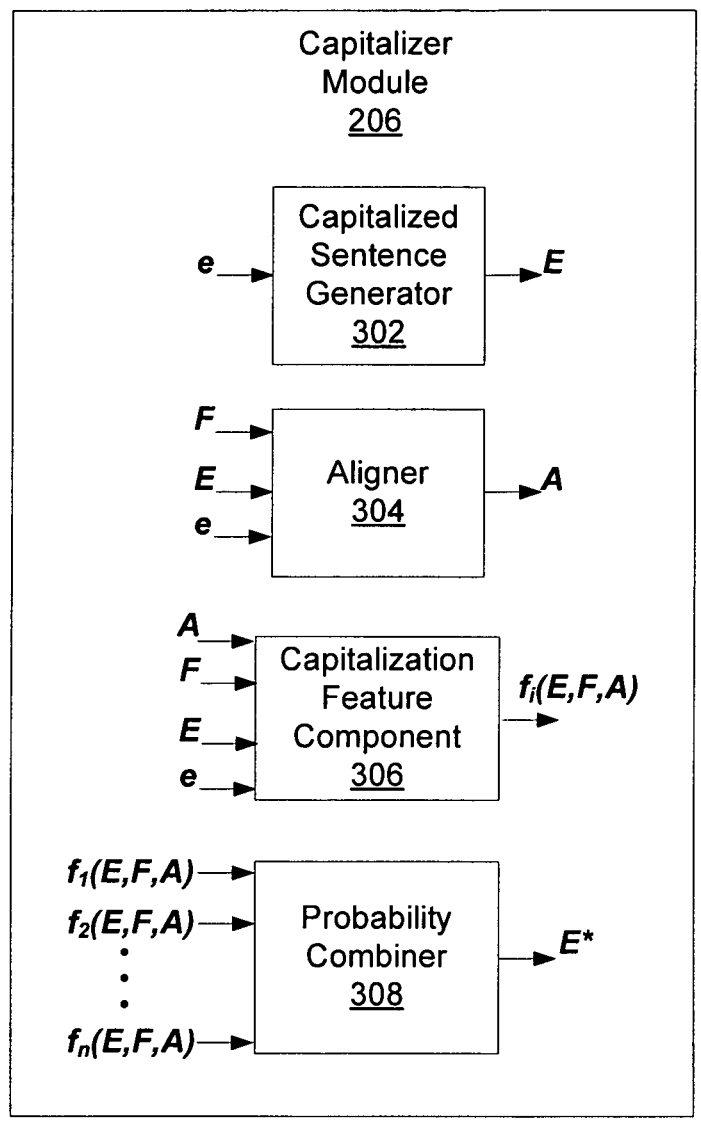
FIG. 3 illustrates a block diagram showing exemplary components associated with the capitalizer module.

FIG. 3 is a block diagram illustrating exemplary components associated with the capitalizer module 206. The capitalizer module 206 is configured to generate a set of capitalized target sentences, designated by "E" in FIG. 3 ("the capitalized target sentence"), and align the capitalized target sentence(s) (e.g., E) with the capitalized input sentence (e.g., F). The capitalizer module 206 may determine one or more probabilities for each of the capitalized target sentences (e.g., E) according to information including, but not necessarily limited to, capitalization information from the capitalized input sentence (e.g., F). The capitalizer module 206 may combine the probabilities to select the best capitalized sentence (e.g., E*) according to the combined probabilities. The capitalizer module 206 may include components, such as a capitalized sentence generator 302, an aligner 304, a capitalization feature component 306, and a probability combiner 308. Although the capitalizer module 206 is described in FIG. 3 as including various components, fewer or more components may comprise the capitalizer module 206 and still fall within the scope of various embodiments.

The capitalized sentence generator 302 receives the lowercase target sentence (e.g., e), for example, from the automatic translator module 204. The capitalized sentence generator 302 is configured to generate one or more capitalization configurations that may be consistent with the lowercase target sentence, comprising a set of possible capitalized target sentences (e.g., E).

According to an exemplary embodiment, the one or more capitalization configurations may be generated according to a function, such as the function GEN(e). The capitalized target sentence (e.g. E) may be a capitalization configuration selected from the one or more capitalization configurations returned by the function (e.g., GEN(e)).

For example, the function GEN may generate a set of capitalization candidate words from a lowercase word, such as a lowercase word designated by w. For example, where the lowercase word w="mt," then GEN(mt)={mt, mT, Mt, MT}.

Heuristics may be used to reduce the range of capitalization candidate words generated by the function (e.g., GEN), according to exemplary embodiments. An example of heuristics includes:

The returned set of GEN on the lowercase words w comprises the union of:

(i) {w,AU(w), IU(w)}
(ii) {v|v is seen in training data and AL(v)=w}
(iii) {$\tilde{F}_{m,k}$|AL($\tilde{F}_{m,k}$)=AL(w)}

The heuristic (iii) may provide candidates in addition to the heuristic (i) and (ii), for the lowercase word (e.g., w) when translated from a strange input word, such as $\tilde{F}_{m,k}$ in a phrase $\tilde{F}_m$, of the capitalized input sentence (e.g., F) that is aligned to a phrase that the lowercase word (e.g., w) is in, or comprises. For example, the heuristic (iii) may be used to create capitalization candidates for the translation of URLs, file names, and file paths. The function, such as GEN, may be applied to each of the lowercase words (e.g., w) in the lowercase target sentence (e.g., e) to generate a set of all possible capitalized target sentences (e.g., E).

The aligner 304 receives the capitalized input sentence, and a capitalized target sentence(s) (e.g., E). Optionally, the aligner 304 may receive the lowercase target sentence (e.g., e). The sentences may be comprised of one or more phrases, as discussed herein. For example, an English sentence, "The red door is closed." may be parsed into the phrases "The red door" and "is closed." An equivalent sentence in German "Die rote Tür ist zu" may be parsed into the phrases, "Die rote Tür" and "ist zu." The phrase "The red door" may be aligned with the phrase "Die rote Tür" and the phrase "is closed" may be aligned with the phrase "ist zu."

The aligner 304 may be configured to associate phrases from the capitalized input sentence with phrases from a capitalized target sentence(s) (e.g., E) generated by the function, such as the function GEN, and output an alignment, designated as "A" in FIG. 3. For example the aligner 304 may associate the phrase "The red door" with the phrase "Die rote Tür." Any methods of obtaining phrase boundaries and the alignment (e.g., A), such as with a statistical phrase-based automatic translation system, may be employed.

Optionally, the capitalized input sentence is aligned with the lowercase target sentence. The capitalized target sentence(s) (e.g., E) may preserve the alignment between the capitalized input sentence (e.g., F) and the lowercase target sentence (e.g., e). The phrase alignment (e.g., A) may be used by the capitalization feature component 306 to determine probabilities of one or more feature functions that a capitalized target sentence(s) (e.g., E) is the best capitalized sentence (e.g., E*).

In various embodiments, a probability that a capitalized target sentence is the best capitalized sentence (e.g., E*) may be determined according to a conditional random field probabilistic model. According to an exemplary embodiment, the probability of the capitalized target sentence E, given the capitalized input sentence and the alignment may be represented as a probability function, such as p(E|F,A). The probability function (e.g., p(E|F,A)) may be determined from information including information from the capitalized input sentence and the alignment between the capitalized input sentence and the capitalized target sentence(s) (e.g., E) comprising one of the one or more capitalization configurations of the lowercase target sentence (e.g., e).

For example, the best capitalized sentence (e.g., E*) may be found from generating all the possible capitalization configurations from the lowercase target sentence and determining the capitalized target sentence(s) with the highest probability, for p(E|F,A). The best capitalized sentence (e.g., E*) may be generated utilizing the relation:

$$E^* = \arg\max_{E \in GEN(e)} p(E|F,A)$$

However, any method for generating the best capitalized sentence may be utilized according to some embodiments.

The capitalization feature component 306 is configured to calculate probabilities, as discussed herein. The capitalization feature component 306 can calculate probabilities for one or more feature functions, such as $f_i(E,F,A)$, for a capitalized target sentence according to the capitalized input sentence and the alignment. According to an exemplary embodiment, "i" represents the $i_{th}$ feature function. The capitalization feature component 306 can output the one or more feature functions, such as $f_i(E,F,A)$, for the capitalized target sentence(s) (e.g., E).

The probability combiner 308 can then combine the one or more feature functions, such as $f_i(E,F,A)$, and calculate the best capitalized sentence (e.g., E*). In various embodiments, the probability combiner 308 sums the probabilities for the one or more feature functions (e.g., $f_i(E,F,A)$) together. The probability combiner 308 can then calculate a weighted sum of the probabilities for the one or more feature functions. For example, the probability combiner 308 may calculate a weighted sum according to the relation:

$$p_{\bar{\lambda}}(E \mid F, A) = \frac{1}{Z(F, A, \bar{\lambda})} \exp\left(\sum_{i=1}^{I} \lambda_i f_i(E, F, A)\right) \quad (2)$$

where:

$$Z(F, A, \bar{\lambda}) = \sum_{E \in GEN(e)} \exp\left(\sum_{i=1}^{I} \lambda_i f_i(E, F, A)\right) \quad (3)$$

and $\bar{\lambda}=(\lambda_i, \ldots, \lambda_I)$ is a feature weight vector. The capitalizer module 206 can utilize the relation to look for the best capitalized sentence (e.g., E*), according to an exemplary embodiment. For example, the best capitalized sentence (e.g., E*) may satisfy the relation:

$$E^* = \arg\max_{E \in GEN(e,F)} \sum_{i=1}^{I} \lambda_i f_i(E, F, A) \quad (4)$$

For each capitalized target sentence (e.g., E), the one or more feature functions (e.g., $f_i(E,F,A)$) may be weighted by a specific weight, such as $\lambda_i$, where i=1 ... I, for the various feature functions and associated weights, respectively.

The probability combiner 308 receives one or more values returned by the one or more feature functions and applies the respective weight (e.g., $\lambda_i$). Capitalization information in the capitalized input sentence (e.g., F) may be associated with the respective weight (e.g., $\lambda_i$). The probability combiner 308 can sum the weighted feature functions, such as $\lambda_i f_i(E,F,A)$) for all feature functions (e.g., i, where i=1 ... I) to determine the probability for the capitalized target sentence(s), According to an exemplary embodiment, the probability combiner 308 can select the capitalized target sentence(s) (e.g., E) with the best probability as the best capitalized sentence (e.g., E*).

Figure 4:
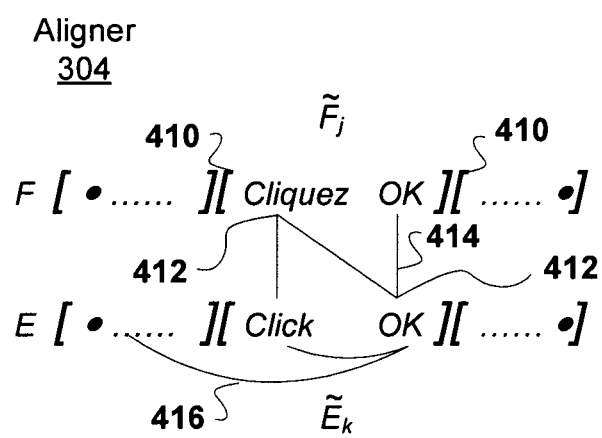
FIG. 4 illustrates a schematic diagram showing an exemplary alignment of two sentences.

FIG. 4 is a schematic diagram illustrating an exemplary alignment of two sentences, such as by using the aligner 304. The aligner 304 may be configured to operate on the capitalized input sentence and the capitalized target sentence(s), such as the capitalized target sentence E generated by the function GEN(e), to determine the alignment (e.g., A). One or more phrase boundaries may be denoted by the square brackets 410.

A vertex 412 corresponds to a word in the capitalized input sentence and the capitalized target sentence E (e.g., "Cliquez" in F, and "OK" in E). A line 414 may connect a word in the capitalized input sentence and a word in the capitalized target sentence (e.g., "Cliquez"—"Click") and correspond to a word alignment. According to an exemplary embodiment, an edge 416 between two words in the capitalized target sentence(s) (e.g., E) represents the dependency between the two words captured by monolingual n-gram language models. For example, if a source phrase (designated "$\tilde{F}_j$," in FIG. 4) is the $j^{th}$ phrase of the capitalized input sentence (e.g., F) and the target phrase (designated "$\tilde{E}_k$," in FIG. 4) is the $k^{th}$ phrase of the capitalized target sentence (e.g., E), they may align to each other.

The alignment does not require word alignment, but a word in the target phrase (e.g., $\tilde{E}_k$) may be aligned to any word in the source phrase (e.g., $\tilde{F}_j$). A probabilistic model defined on a diagram, such as the diagram of FIG. 4, may be referred to as a conditional random field (CRF). A capitalization model using the CRF may be represented by the relation given in equation (2), (3), and (4), discussed herein, where each feature function (e.g., $f_i(E,F,A)$) may be defined on the $k_{th}$ target word (e.g., $E_k$) of the $k_{th}$ target phrase (e.g., $\tilde{E}_k$) of the capitalized target sentence(s) (e.g., E), relative to the $j_{th}$ source word (e.g., $F_j$) of the $j_{th}$ source phrase (e.g., $\tilde{F}_j$), where the target phrase (e.g., $\tilde{E}_k$) and the source phrase (e.g., $\tilde{F}_j$) are aligned.

Figure 5:
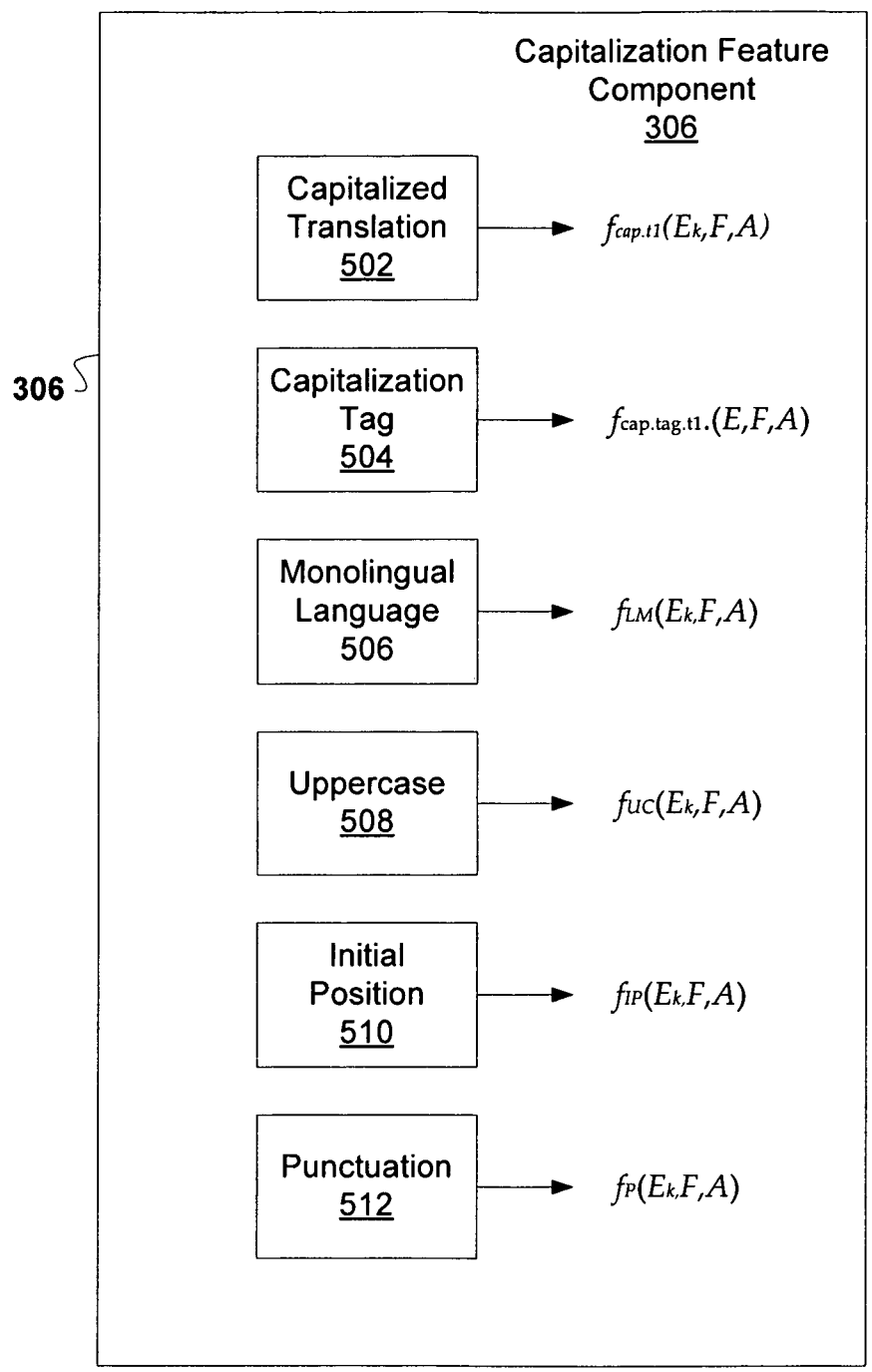
FIG. 5 illustrates a block diagram showing an exemplary capitalization feature component.

FIG. 5 is a block diagram illustrating an exemplary capitalization feature component 306 of FIG. 3. The capitalization feature component 306 comprises a capitalized translation model feature 502, a capitalization tag model feature 504, an uppercase translation model feature 508, a monolingual language model feature 506, an initial position model feature 510, and a punctuation model feature 512. Although FIG. 5 describes various model features comprising the capitalization feature component 306, fewer or more model features may comprise the capitalization feature component 306 and still fall within the scope of various embodiments.

The capitalized translation model feature 502 includes a feature function, such as $f_{cap.t1}(E_k,F,A)$. According to the feature function, the larger the probability that a target word (e.g., $E_k$) is translated from a source word (e.g., $F_j$), the larger the probability that the translated word preserves the case of the source word. Referring to the example of FIG. 4, the phrase "Click OK" is part of the target phrase (e.g., $\tilde{E}_k$), in the capitalized target sentence(s) (e.g., E). As illustrated in FIG. 4, the phrase "Cliquez OK" is the source phrase (e.g., $\tilde{F}_j$), in the capitalized input sentence (e.g., F) and the source phrase (e.g., $\tilde{F}_j$) is aligned to the target phrase (e.g., $\tilde{E}_k$). The capitalized translation model feature 502 computes, for example, a word probability (e.g., $p(E_k|\tilde{F}_{m,n})$) of "Click." The word probability may be computed by an equation, such as log p(Click|Cliquez)+log p(Click|OK), for instance. "Click" may be assumed to be aligned to any word in the source phrase (e.g., $\tilde{F}_j$). The larger the probability that "Click" is translated from a word in the source phrase, i.e., "Cliquez," the more chances that "Click" preserves the case of "Cliquez" in the target phrase (e.g., $\tilde{E}_k$).

According to an exemplary embodiment, for the translated word ($E_k$) and an aligned phrase pair, such as $\tilde{E}_k$ and $\tilde{F}_m$, where $E_k \in \tilde{E}_l$, the capitalized translation model feature 502 of the translated word ($E_k$) comprises the feature function represented by the relation:

$$f_{cap.t1}(E_k, F, A) = \log \sum_{n=1}^{|\tilde{F}_m|} p(E_k \mid \tilde{F}_{m,n}) \quad (5)$$

where the probability (e.g., $p(E_k|\tilde{F}_{m,n})$) may be determined according to a capitalized translation table. The capitalized translation table, such as for the probability $p(E_k|\tilde{F}_{m,n})$, may be smoothed according to well known techniques to avoid negative infinite values for the feature function (e.g., $f_{cap.t1}(E_k,F,A)$).

In some embodiments, the capitalized translation table, such as for the probability $p(E_k|\tilde{F}_{m,n})$, may be estimated from a word-aligned bilingual corpus. The capitalized translation model feature 502 may output the feature function (e.g., $f_{cap.t1}(E_k,F,A)$) to the probability combiner 308. The probability combiner 308 may apply a feature weight, such as $\lambda_{cap.t1}$, to the feature function (e.g., $f_{cap.t1}(E_k,F,A)$) and accumulate a weighted feature function (e.g., $\lambda_{cap.t1} f_{cap.t1}(E_k,F,A)$), according to equation (4).

The capitalization tag model feature 504 may be used to associate tags with words to indicate capitalization. Examples of capitalization tags include: initial capital (IU), all characters uppercase (AU), all characters lowercase (AL), mixed case (MX), and all characters having no case (AN). For example, lowercase words in a lowercase sentence e "click ok to save your changes to /home/doc" may be associated with tags to give the output sentence "click IU ok AU to AL save AL your AL changes AL to AL /home/doc MX.AN." A corresponding capitalized target sentence E may state "Click OK to save your changes to /home/DOC."

In some embodiments, the capitalization tag model feature 504 includes a tag feature function, such as $f_{cap.tag.t1}(E,F,A)$. The capitalization tag feature function (e.g., $f_{cap.tag.t1}(E,F,A)$) may be based on the capitalization tag for the aligned phrases in the capitalized input sentence and the capitalized target sentence. Referring to the example of FIG. 4, a probability of the word "Click" aligning to the phrase "Cliquez OK" may be represented as $\log(p(IU|IU)p(click|cliquez))+\log(p(IU|AU)p(click|ok))$. The probability may be computed in terms of a tag translation probability, such as p(IU|AU), and a lowercase word translation probability, such as p(click|ok), for example.

The lowercase word translation probability may be used to determine how much of the tag translation probability will contribute to the calculation of the best capitalized sentence (e.g., E*). A smaller value of the word translation probability (e.g., p(click|ok)) typically results in a smaller chance that the surface form of "click" preserves the case information from that of "ok" in the input capitalized sentence (e.g., F). This feature may be represented by the equation:

$$f_{cap.tag.t1}(E_k, F, A) = \log \sum_{n=1}^{\tilde{f}_m} p(e_k \mid \tilde{f}_{m,n}) \times p(\tau(E_k) \mid \tau(\tilde{F}_{m,n})) \quad (6)$$

where $p(e_k|\tilde{f}_{m,n})$ may be determined according to a translation table (t-table) over lowercase word pairs, such as a t-table in a statistical automatic translation system. The term $p(\tau(E_k)|\tau(\tilde{F}_{m,n}))$ may be determined according to the probability of a target capitalization tag, given a source capitalization tag, and may be estimated from a word-aligned bilingual corpus, according to an exemplary embodiment.

The capitalization tag model feature 504 provides additional probability information to the probability combiner 308, for example, when a capitalized word pair is unseen. For example, word pairs that have not previously been observed co-occurring in a sentence pair (e.g., unseen words pairs) may comprise words without a one to one translation equivalent. In some embodiments, the term $p(e_k|\tilde{f}_{m,n})$ and/or $p(\tau(E_k)|\tau(\tilde{F}_{m,n}))$ may be smoothed to handle unseen words or unseen word pairs. The capitalization tag model feature 504 outputs the tag feature function (e.g., $f_{cap.tag.t1}(E,F,A)$). According to an exemplary embodiment, the probability combiner 308 may apply a feature weight (e.g. $\lambda_{cap.tag.t1}$) to the feature function (e.g., $f_{cap.t1}(E_k,F,A)$) and accumulate a tag weighted feature function (e.g., $\lambda_{cap.tag.t1} f_{cap.t1}(E_k,F,A)$), such as by utilizing equation (4). However, any process for obtaining a weighted probability for capitalization may be employed.

The monolingual language model feature 506 comprises a monolingual feature function, such as $f_{LM}(E_k,F,A)$. The monolingual language model feature 506 may ignore information available from the capitalized input sentence F and the alignment A. The monolingual language model feature 506 may compute a probability, such as $p(E_i|E_{i-1}, \ldots, E_{i-n+1})$, of an occurrence of the translated word ($E_k$) according to the logarithm of the probability of an n-gram ending at the translated word ($E_k$). The monolingual feature function $f_{LM}(E_k,F,A)$ may be represented, According to an exemplary embodiment, as:

$$f_{LM}(E_i,F,A) = \log p(E_i|E_{i-1}, \ldots, E_{i-n+1}) \quad (7)$$

The probability (e.g., $p(E_i|E_{i-1}, \ldots, E_{i-n+1})$) may be appropriately smoothed such that $p(E_i|E_{i-1}, \ldots, E_{i-n+1})$ never returns zero.

The monolingual language model feature 506 outputs the monolingual feature function ($f_{LM}(E_k,F,A)$), to the probability combiner 308, for example. The probability combiner 308 can apply the feature weight, such as $\lambda_{LM}$, to the monolingual feature function and accumulate a weighted feature function, such as $\lambda_{LM} f_{LM}(E_k,F,A)$, according to equation (4), for example.

The uppercase translation model feature 508 comprises an uppercase feature function, such as $f_{UC}(E_k,F,A)$. The uppercase translation model feature 508 is configured to receive the capitalized input sentence (e.g., F), the capitalized target sentence(s) (e.g., E), and the alignment (e.g., A), and output the uppercase feature function (e.g., $f_{UC}(E_k,F,A)$). The translated word (e.g., $E_k$) may be in all uppercase if the words in a corresponding phrase, such as the source phrase (e.g., $\tilde{F}_j$) discussed in FIG. 4, of the capitalized input sentence are in uppercase.

The uppercase translation model feature 508 may be captured by the capitalization tag model feature 504, for example, where the probability of a tag, such as an AU tag, in the capitalized input sentence is preserved in the target capitalized sentence(s). However, in some embodiments, the uppercase translation model feature 508 further enhances the probability of the target capitalized sentence.

The uppercase translation model feature 508 increases the probability, for example, to translate "ABC XYZ" in the capitalized input sentence (e.g., F) into "UUU VVV" in the best capitalized sentence (e.g., E*), even if all words are unseen. The uppercase translation model feature 508 outputs the uppercase feature function (e.g., $f_{UC}(E_k,F,A)$). The probability combiner 308 may apply a feature weight, such as $\lambda_{UC}$, to the uppercase feature function and accumulate the weighted feature function $\lambda_{UC} f_{UC}(E_k,F,A)$, for example, according to equation (4).

The initial position model feature 510 comprises an initial position feature function, such as $f_{IP}(E_k,F,A)$. The initial position model feature 510 is configured to receive the capitalized target sentence(s) (e.g., E) and output the feature function (e.g., $f_{IP}(E_k,F,A)$). The initial position model feature 510 may ignore information available from the capitalized input sentence (e.g., F) and the alignment (e.g., A). The translated word (e.g., $E_k$) in the capitalized target sentence(s) may be initially capitalized if it is the first word that contains letters in the capitalized target sentence. For example, for a sentence "• Please click the button" that starts with a bullet, the initial position feature value of the word "please" is 1 because the bullet ("•") does not contain a letter. The initial position model feature 510 outputs the initial position feature function (e.g., $f_{IP}(E_k,F,A)$). The probability combiner 308 may apply a feature weight, such as $\lambda_{IP}$, to the feature function and accumulate a weighted feature function, such as $\lambda_{IP}f_{IP}(E_k,F,A)$, utilizing, for example, equation (4).

The punctuation model feature 512 includes a punctuation feature function, such as $f_P(E_k,F,A)$. The punctuation model feature 512 is configured to receive the capitalized target sentence and output the feature function (e.g., $f_P(E_k,F,A)$). The punctuation model feature 512 may ignore information available from the capitalized input sentence and the alignment. The translated word (e.g., $E_k$) may initially be capitalized if the translated word follows a punctuation mark, for example. For non-sentence-ending punctuation marks, such as a comma, a colon, and the like, a negative feature weight, such as $\lambda_{Pw}$, may be applied to the translated word. The punctuation model feature 512 outputs the punctuation feature function (e.g., $f_P(E_k,F,A)$). The probability combiner 308 may apply a feature weight, such as $\lambda_P$, to the punctuation feature function and accumulates a feature function, such as $\lambda_P f_P(E_k,F,A)$, according to equation (4), for example.

Although various feature functions have been described in FIG. 5, fewer or more feature functions may be provided for generating a best capitalized sentence (e.g., E*) and still fall within the scope of various embodiments. Further, the equations described herein are exemplary and other equations utilized for generating the best capitalized sentence may vary or differentiate from the exemplary equations set forth herein and still fall within the scope of various embodiments.

Figure 6:
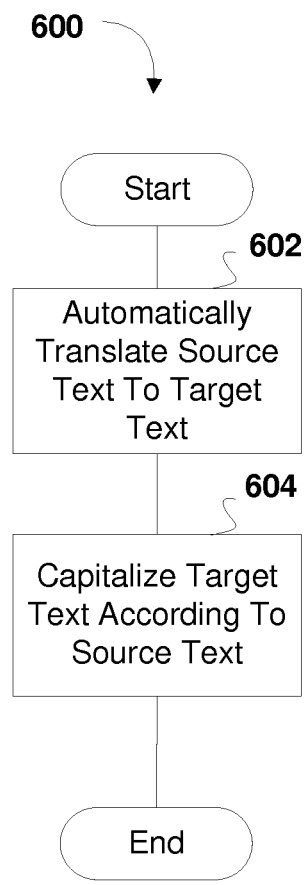
FIG. 6 a flow diagram illustrating a process for capitalizing translated text.

FIG. 6 is a flow diagram illustrating a process 600 for capitalizing translated text, such as by using a bilingual capitalization model. At step 602, a capitalized source text from a source language is translated to a target text in a target language.

As discussed herein, the source text may be translated in units of a capitalized sentence in a source language or a capitalized input sentence (F). The target text output of the translation may include a lowercase sentence e. For clarity, the process is described as operating on text strings in units of "sentences." However, text strings in any arbitrary lengths or units may be utilized in the process of capitalizing the translated text.

Automatic translation of the capitalized input sentence (F) may be performed by any of a number of techniques, such as statistical automatic translation, statistical phrase-based automatic translation, 1-gram automatic translation, n-gram automatic translation, syntax-based automatic translation, and so forth.

According to an exemplary embodiment, the automatic translation of the capitalized input sentence (e.g., F) to the lowercase target sentence (e.g., e) may be performed in the automatic translation server 106, by using the case remover module 202 to generate a lowercase source sentence (e.g., $f$) and by using the automatic translator module 204 to translate the lowercase source sentence to the lowercase target sentence.

At step 604, the target text is capitalized according to information in the capitalized source text. For example, the target text may be capitalized by the capitalizer module 206 of the automatic translation server 106 as described elsewhere herein. According to an exemplary embodiment, the capitalizer module 206 may receive the capitalized input sentence, the lowercase target sentence, and the lowercase source sentence. The capitalizer module 206 may generate one or more capitalization configurations and select the best capitalization configuration (e.g., the best capitalized sentence (E*)) according to information in the capitalized input sentence (e.g., F).

Various exemplary embodiments are specifically illustrated and/or described herein. However, it will be appreciated that modifications and variations are covered by the above teachings and within the scope of the appended claims without departing from the spirit and intended scope thereof. For example, additional model features for computing weighted feature functions (e.g., $\lambda_i f_i(E_i,F,A)$), according to information about text and/or alignment may be applied or a model feature may be configured to apply negatively weighted probabilities to capitalized nouns, in a source language where all nouns are capitalized (e.g., German) when translated to a target language where only proper nouns are capitalized, (e.g., English). As another example, an embodiment of the capitalization model may include a syntax-based MT, rather a than phrase-based statistical MT translation system. The syntax based MT may include a description of the translational correspondence within a translation rule, or a synchronous production, rather than a translational phrase pair: Training data may be derivation forests, instead of a phrase-aligned bilingual corpus.

While various embodiments have been described above, it should be understood that they have been presented by way of example only, and not limitation. For example, any of the elements associated with the automatic translation server 106 may employ any of the desired functionality set forth hereinabove. Thus, the breadth and scope of a preferred embodiment should not be limited by any of the above-described exemplary embodiments.

What is claimed is:

1. A method for capitalizing translated text comprising:
   executing a translator module stored on a device to automatically translate a capitalized source text to a target text, wherein prior to translation the capitalized source text is converted to lower case and then translated; and
   capitalizing the target text according to capitalization information in the capitalized source text and the target text, wherein the step of capitalizing the target text according to capitalization information in the capitalized source text includes:
   generating one or more capitalization configurations for the target text;
   computing a configuration probability for each of the one or more capitalization configurations, the configuration probability computed from capitalization information in the capitalized source text and at least one capitalization model feature function based on an alignment between the capitalized source text and the target text or the capitalized source text and the capitalization configuration; and
   selecting the best capitalization configuration based on the highest configuration probability.

2. The method of claim 1 further comprising capitalizing the target text according to the translated target text.

3. The method of claim 1 further comprising capitalizing the target text using conditional random fields.

4. The method of claim 1 wherein the step of capitalizing the target text further comprises:
assigning the computed configuration probability to each respective one or more capitalization configurations, wherein the configuration probability is computed for the one or more capitalization configurations.

5. The method of claim 4 wherein the at least one capitalization model feature function includes a capitalized translation model feature function.

6. The method of claim 4 wherein the at least one capitalization model feature function includes a capitalization tag model feature function.

7. The method of claim 4 wherein the at least one capitalization model feature function includes an uppercase model feature function.

8. The method of claim 4 wherein the at least one capitalization model feature function includes a monolingual language model feature function.

9. The method of claim 4 wherein the at least one capitalization model feature function includes an initial position model feature function.

10. The method of claim 4 wherein the at least one capitalization model feature function includes a punctuation model feature function.

11. The method of claim 4, further including:
selecting a source phrase from the capitalized source text;
selecting a target phrase from the target text;
determining an alignment between the source phrase and the target phrase;
computing a word probability from capitalization information in the source phrase, the alignment, and the at least one capitalization model feature function for the one or more capitalization configurations; and
applying the word probability to the computing of the configuration probability.

12. The method of claim 11 wherein the at least one capitalization model feature function includes a capitalized translation model feature function.

13. The method of claim 11 wherein the at least one capitalization model feature function includes a capitalization tag model feature function.

14. The method of claim 11 wherein the at least one capitalization model feature function includes an uppercase model feature function.

15. A translation system comprising:
a device;
an automatic translator module executable and stored on the device and configured to automatically convert a capitalized source text to lower case text and translate the lower case text to a target text; and
a capitalization module configured to recover a capitalized text from the target text according to capitalization information in the capitalized source text and the target text, and capitalize the target text, the capitalization of the target text including:
generating a plurality of capitalization configurations for the target text;
for each capitalization configuration, computing a feature probability for each of a plurality of capitalization model feature functions;
associating a feature weight with each capitalization model feature function;
applying the associated feature weight to the respective computed feature probability for each of the plurality of capitalization model feature functions;
for each capitalization configuration, calculating a capitalization configuration probability based on a weighted sum of the computed feature probabilities and applied feature weights, and based on an alignment between the capitalized source text and the target text or the capitalized source text and the capitalization configuration; and
selecting the best capitalization configuration from the plurality of capitalization configurations based on the highest calculated capitalization configuration probability.

16. The translation system of claim 15, wherein the capitalization module is further configured to recover the capitalized text from the source text.

17. A translation system comprising:
a device;
an automatic translator module executable and stored on the device and configured to automatically convert a capitalized source text to lower case text and translate the lower case text to a target text;
an aligner configured to determine an alignment between one or more phrases in the capitalized source text and one or more respective phrases in the target text of a capitalization configuration; and
a capitalization module configured to recover a capitalized text from the target text according to capitalization information in the capitalized source text and the target text and the alignment determined by the aligner, and to capitalize the target text,
the capitalization of the target text including:
generating a plurality of capitalization configurations for the target text;
for each capitalization configuration, computing a feature probability for each of a plurality of capitalization model feature functions;
associating a feature weight with each capitalization model feature function;
applying the associated feature weight to the respective computed feature probability for each of the plurality of capitalization model feature functions;
for each capitalization configuration, calculating a capitalization configuration probability based on a weighted sum of the computed feature probabilities and applied feature weights, and based on the alignment between the one or more phrases in the capitalized source text and the one or more phrases in the target text or between the capitalized source text and the capitalization configuration;
assigning the calculated capitalization configuration probability to each respective capitalization configuration; and
selecting the best capitalization configuration from the plurality of capitalization configurations based on the highest calculated capitalization configuration probability.

18. The translation system of claim 17 wherein the capitalization module further includes a capitalized translation model feature function.

19. The translation system of claim 17 wherein the capitalization module further includes a capitalization tag model feature function.

20. The translation system of claim 17 wherein the capitalization module further includes an uppercase model feature function.

21. The translation system of claim 17 wherein the capitalization module further includes a monolingual language model feature function.

22. The translation system of claim 17 wherein the capitalization module further includes an initial position model feature function.

23. The translation system of claim 17 wherein the capitalization module further includes a punctuation model feature function.

24. A computer program embodied on a non-transitory computer readable medium having instructions for capitalizing translated text, comprising:

executing a translator module stored on a device to automatically translate a capitalized source text to a target text, the translation of the capitalized source text including converting source text to lower case and translating the lower case source text; and capitalizing the target text according to capitalization information in the capitalized source text, the step of capitalizing the target text according to the capitalized source text including:

generating one or more capitalization configurations for the target text;

computing a configuration probability for each of the one or more capitalization configurations, the configuration probability computed from capitalization information in the capitalized source text and at least one capitalization model feature function based on an alignment between the capitalized source text and the target text or the capitalized source text and the capitalization configuration; and selecting the best capitalization configuration based on the highest computed configuration probability.

* * * * *